Nov. 6, 1962 G. C. ELLERBECK 3,062,439
PROGRAM CONTROL MECHANISM FOR A SQUARE ROOT CALCULATING MACHINE
Filed Aug. 4, 1959 11 Sheets-Sheet 1

Nov. 6, 1962 G. C. ELLERBECK 3,062,439
PROGRAM CONTROL MECHANISM FOR A SQUARE ROOT CALCULATING MACHINE
Filed Aug. 4, 1959 11 Sheets-Sheet 4

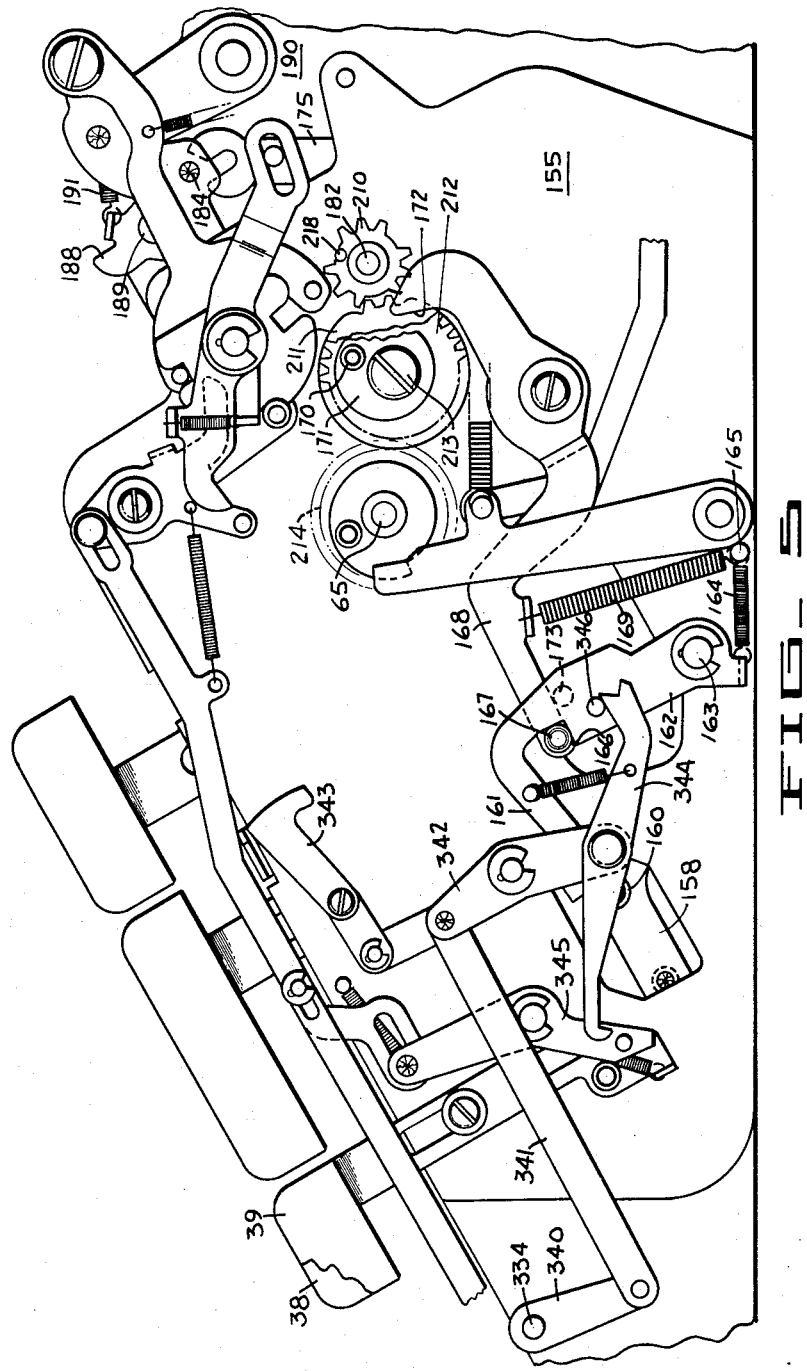

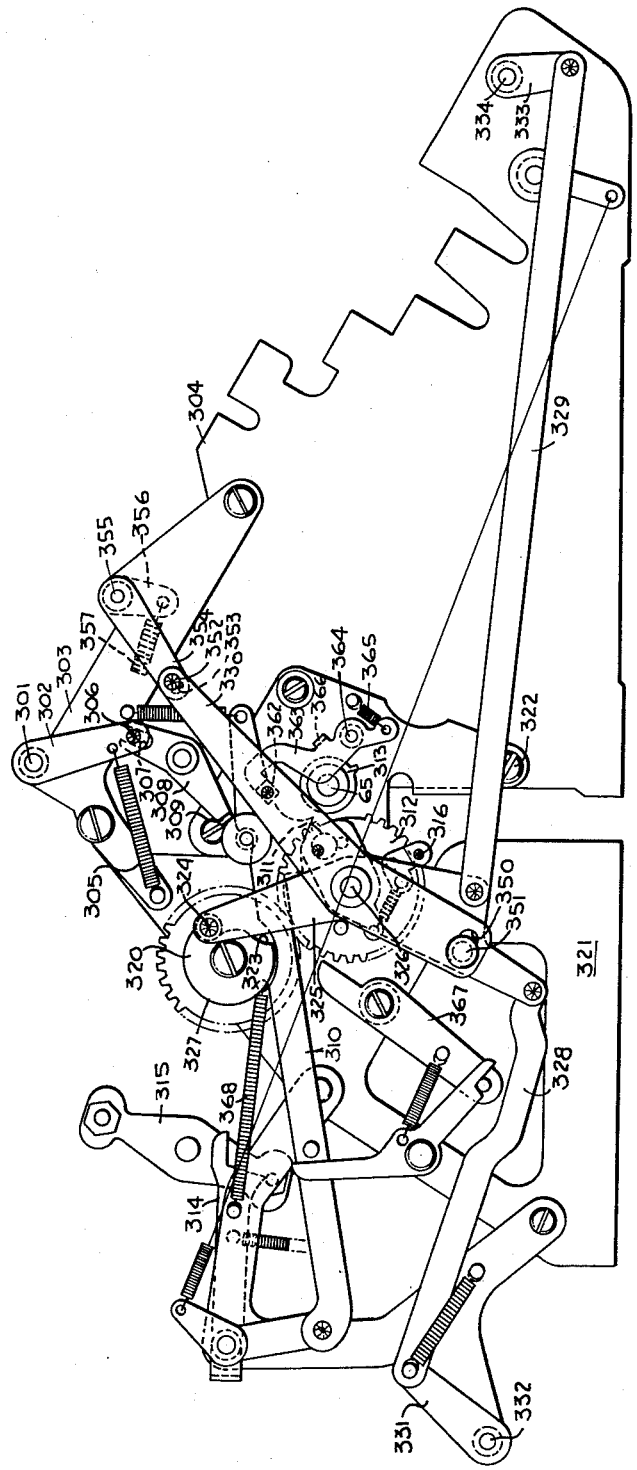

Nov. 6, 1962    G. C. ELLERBECK    3,062,439
PROGRAM CONTROL MECHANISM FOR A SQUARE ROOT CALCULATING MACHINE
Filed Aug. 4, 1959    11 Sheets-Sheet 7
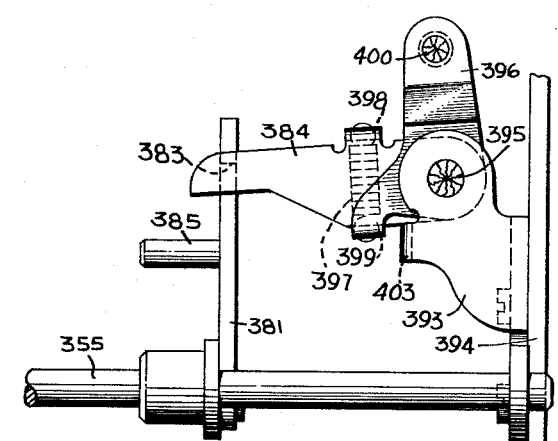
FIG_7
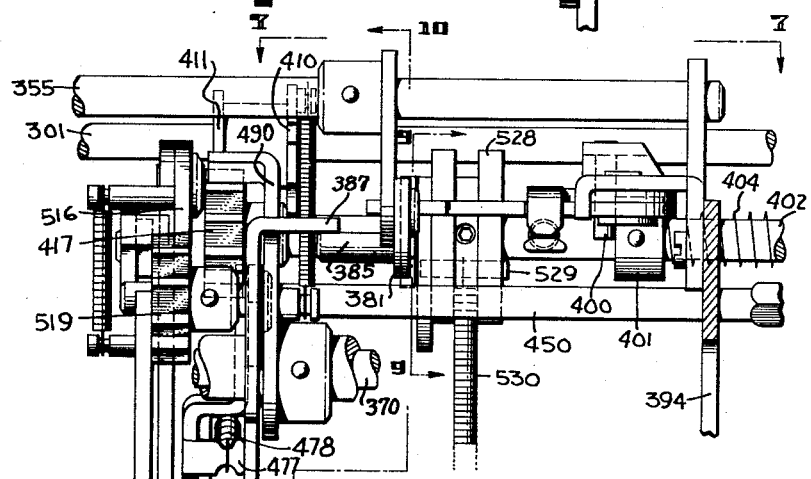
FIG_8
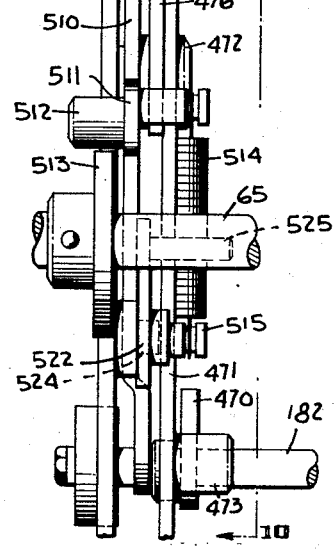
FIG_9

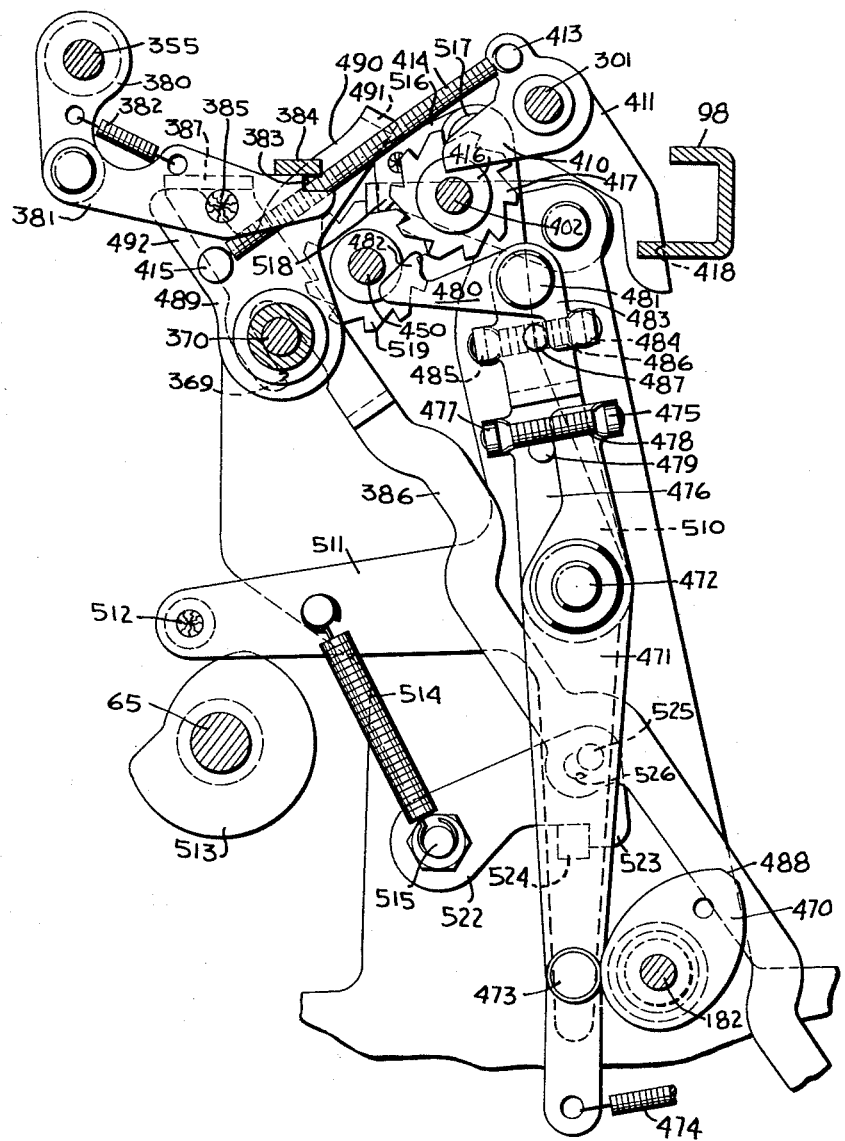
FIG_10

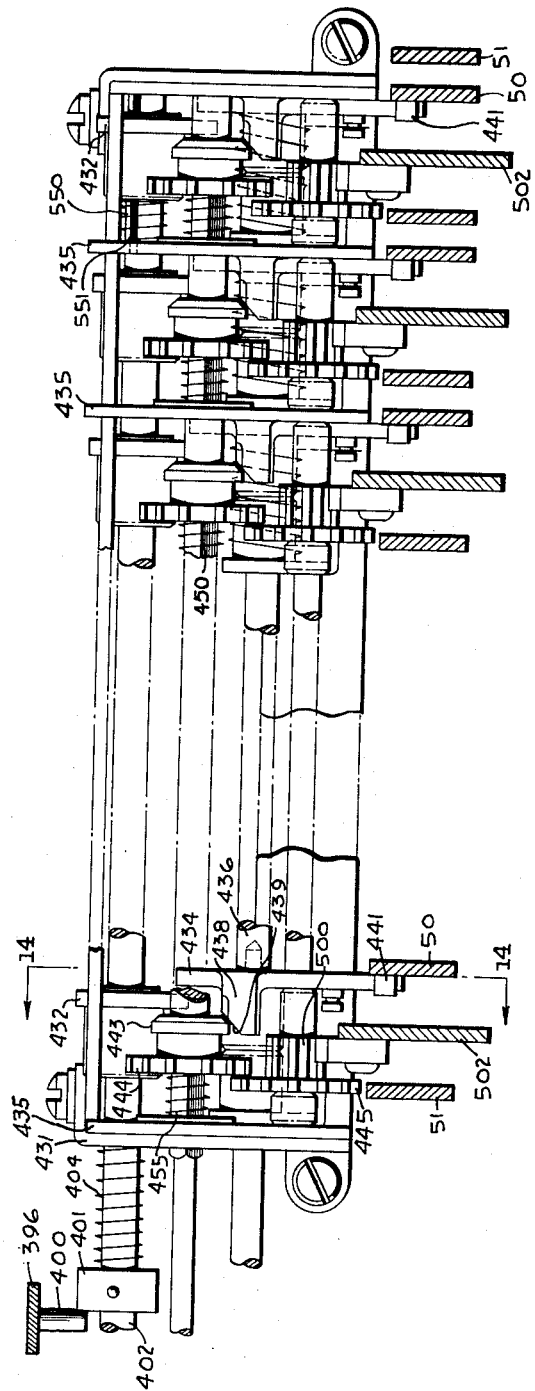
FIG_11

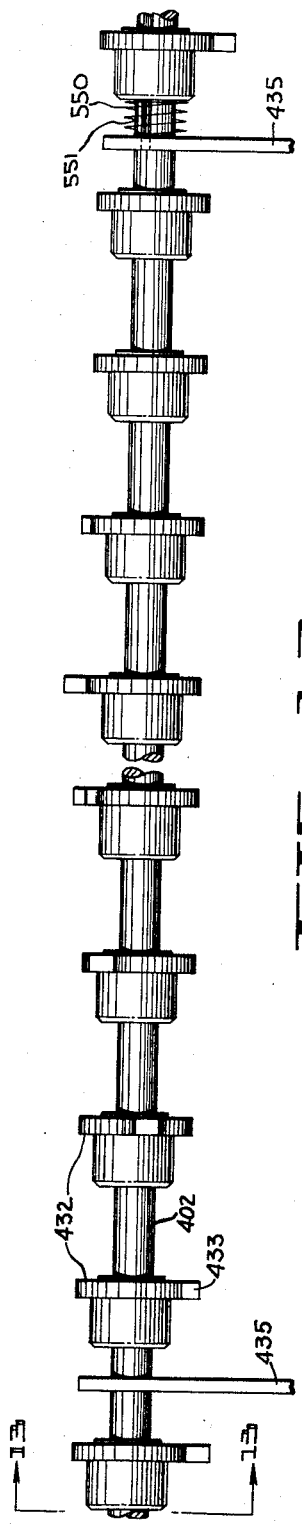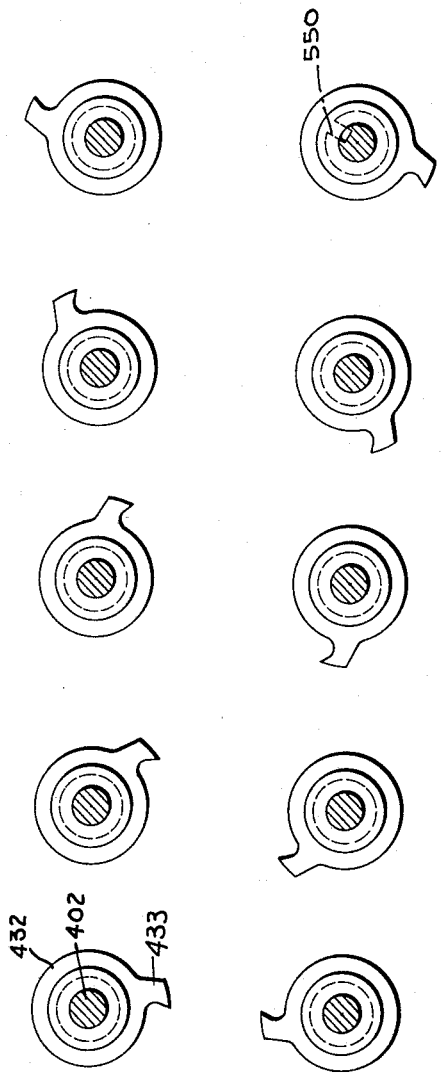

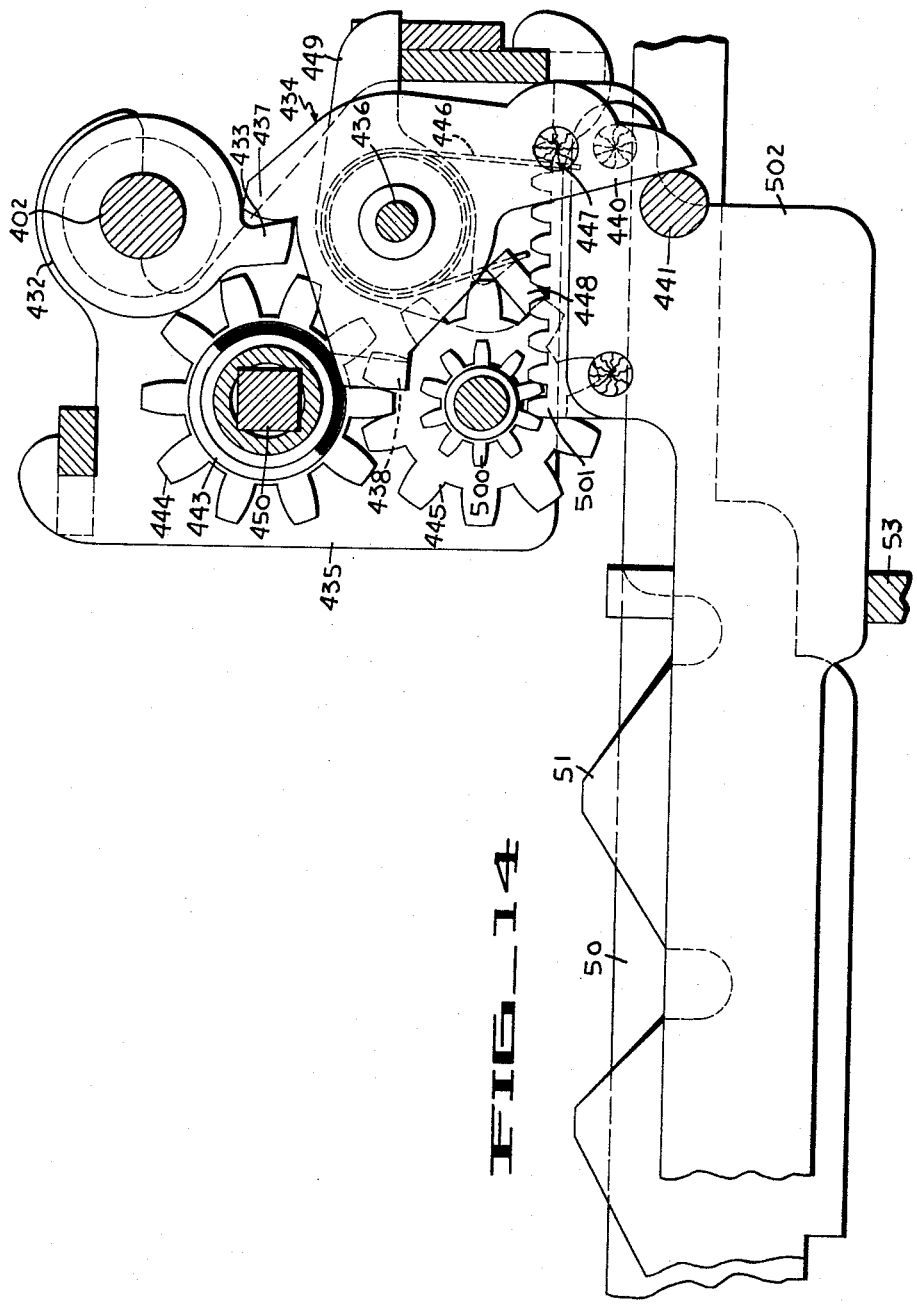

United States Patent Office 3,062,439
Patented Nov. 6, 1962

3,062,439
PROGRAM CONTROL MECHANISM FOR A
SQUARE ROOT CALCULATING MACHINE
Grant C. Ellerbeck, San Leandro, Calif., assignor to Friden, Inc., a corporation of California
Filed Aug. 4, 1959, Ser. No. 831,647
5 Claims. (Cl. 235—63)

This invention relates to calculating machines and particularly to one which, in addition to performing the usual four calculations of addition, subtraction, multiplication and division, will automatically extract the square root of a radicand (either whole, decimal, or mixed) that is set in the keyboard of the machine, as shown in my patents, Nos. 2,736,493 and 2,736,494, both issued on February 28, 1956.

The primary object of this invention is to provide an improved means for angularly adjusting the cam shaft which is operative to select the order in which the selection mechanism is adjustable.

Another object of the invention is to more positively enter a value of "5" (the value of "5" used for the so-called "five's method" of extraction of square root) in the ninth order of the keyboard to initiate the first subtraction of the square root program.

A still further object of this invention is to initiate the feed, or adjustment, of the square root cam shaft at the outset of the shift cycle in the three-cycle program, which terminates subtraction in one order and initiates it in the next, thereby giving added time for the adjustment of the square root cam shaft.

In my previous Patent No. 2,736,494, issued February 28, 1956, entitled "Square Root Calculating Machine," the feed, or adjustment, of the square root cam shaft was adequate in function, but was operated directly by the motion of the shifting carriage. This necessitated critical timing in the feeding of the square root cam shaft. Also, the mechanism to adjust the square root cam shaft consisted of worm gears and a slip clutch that were costly to manufacture. In my present invention I have improved the means mentioned above, in that the square root cam shaft is directly driven from the conventional division program shaft. The rocking of this shaft initiates the additive overdraft correcting cycle, the shift cycle at the end of each ordinal series of operations, and the reinitiating of continuous subtraction in the adjacent lower order. Thus, the square root cam shaft will be fed at the outset of this shift cycle, even slightly before the carriage starts its shift. This will give added time to the adjustment of the cam shaft, whereby its operation will be completed before the end of the shift cycle. It will also eliminate the use of the worm gears and the slip clutch that was used in my previously issued patent mentioned above.

It is believed that the invention will be more readily understood by reference to the drawings, which form a part of the specification and in which:

FIG. 5 is a right side view of the right-hand control plate shown in FIG. 4 with the carriage omitted, showing other details of the division mechanism.

FIG. 6 is a left side view of the machine with a carriage and covers removed, showing the mechanism utilized to control the entry of the radicand factor into the accumulator and to initiate the extraction operation.

FIG. 7 is a plan view of the mechanism operative to condition a square root programming mechanism for operation to extract square root, taken along a plane parallel to the top of the machine, as indicated by the line 7—7 of FIG. 8.

FIG. 8 is a front view of the mechanism shown in FIG. 7 and additional driving mechanism therefor, certain immaterial parts having been omitted for purposes of clarification.

FIG. 9 is a detail left side view of a certain mechanism shown in FIG. 8, taken along the plane indicated by the line 9—9 of FIG. 8.

FIG. 10 is a view of the cam shaft positioning mechanism taken along the vertical planes indicated by the lines 10—10 of FIG. 8.

FIG. 11 is a front view of the square root programming mechanism.

FIG. 12 is a detail front view of the cam shaft showing the relative ordinal location of the various cams.

FIG. 13 shows the details in angular locations of the respective cams shown in FIG. 12, such as taken along the line 13—13 of FIG. 12.

FIG. 14 is a longitudinal cross-sectional view through the square root programming mechanism taken on the plane indicated by the line 14—14 of FIG. 11.

The extraction of square root can be considered as a performance of a division operation with a progressively changing divisor, i.e., one in which the divisor is changed automatically between each cycle of operation. This is accomplished in the Friden-type machine by utilizing the conventional division mechanism to maintain the machine in a continuous subtractive operation, and continuing the subtraction to an overdraft. The overdraft mechanism enables the division programming mechanism to cause a multicyclic operation, the first of which adds back the value which caused the overdraft, the second cycle then shifts the carriage one order to the left, and finally the third cycle, initiates another continuous subtractive operation.

The conventional Friden division programming operation is used to the extent, as mentioned in the above-mentioned patents, that interordinal changes are controlled by sensing an overdraft and then initiating operation of the division programming mechanism. The extraction of square root, however, differs from conventional division in that the divisor is changed in each cycle according to the progression described in the above patent. In the "five's method" of Patent No. 2,736,494, this progression results in the subtraction of the value of "5" in the predetermined order in the first cycle of operation, and in each successive cycle the value is increased by "10" (or "1" in the next higher order) until the operation causes an overdraft. Thereupon, the overdraft is automatically corrected and the carriage is shifted one order to the left. Substantially simultaneously with the shifting of the carriage, the "5" is erased and inserted in the next lower order, the value standing in the tens order of the previous series of divisors remaining unchanged. In the first cycle of operation after the carriage is shifted, the value standing in the tens order of the divisor at the time of the overdraft constitutes the value standing in the hundreds order, the first cycle subtracting that value plus "05." Each successive cycle progressively changes this value by increasing it by "10," so that the second cycle will have "15" standing in the lower two orders of the divisor, the hundreds value remaining unchanged throughout. This second series of operations is continued to an overdraft, after which the overdraft is corrected and the carriage again shifted to the left, and the operation is repeated.

Figure 1:
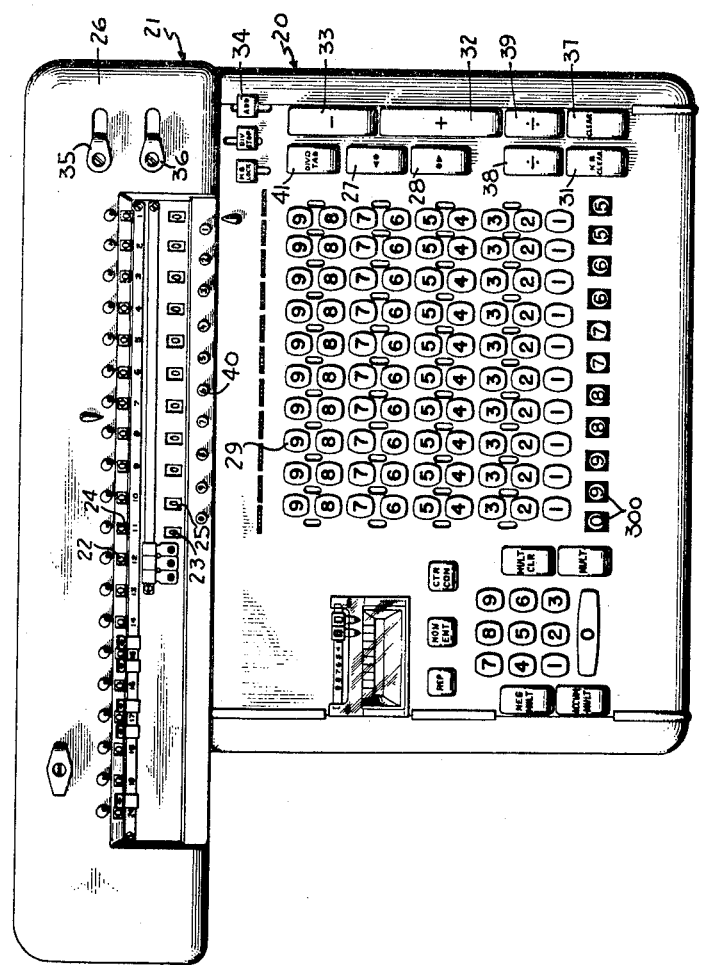
FIG. 1 is a plan view of the calculating machine in which the present invention is incorporated.

Referring to FIG. 1, the calculating machine incorporating the present invention includes a main body portion 20 (containing the actuating, selecting and control mechanisms of the machine), and an accumulator and revolutions counter carriage 21 which is mounted for endwise shifting movement transversely of the body portion 20. The carriage 21 has mounted therein a series of accumulator dials 22 and also a group of revolutions counter dials 23 which are viewable through suitable windows 24 and 25, respectively, provided in the cover 26 of the carriage. The carriage may be shifted by power in either direction across the machine by manipulation of a left shift key 27 and a right shift key 28 located on the right-hand side of the machine.

Numerical values may be entered in the machine by depression of appropriate numeral keys 29 of a conventional value keyboard, the keys being resiliently urged to a raised position by suitable springs 30 (FIG. 2) and latched in a depressed operative position by conventional latching means. The value set in the keyboard may be released by depression of a keyboard clear key 31. The various values set in the keyboard may be registered additively or subtractively on the accumulator wheels 22 by the depression of a plus key 32 or a minus key 33, respectively. If it is desired that the keyboard be cleared after each registration of a number in the accumulator, an add key 34 may be operated and latched in a well-known manner.

The accumulator dials 22 and the revolutions counter dials 23 may be cleared, or reset to "0," by the manipulation of manually operable reset knobs 35 and 36, respectively, these knobs being mounted for lateral sliding movement in the framework of the carriage. Alternatively, the wheels 22 and 23 may be zeroized by power through the depression of a register clearing key 37.

The machine is adapted to perform automatic division by manipulation of a division key 38 which controls a division mechanism similar to the type described in the patent to Friden, No. 2,327,981, issued August 31, 1943. A counter reversing key 39 is conventionally placed laterally adjacent the division key 38, so that both may be depressed by a single finger stroke. The counter reversing key is depressed whenever a true, or positive, quotient is desired.

The machine is also provided with a group of ordinally arranged tabulator keys 40 and a dividend entry key 41 for effecting the entry of a dividend set on the amount keys 29 into the accumulator wheels 22 in any selected ordinal position of the carriage. This mechanism is fully shown and described in U.S. Patent, No. 2,403,273, issued to Carl M. F. Friden et al. on July 2, 1946, and reference is made to this patent for a detailed explanation of the dividend entry mechanism. It can be mentioned here that in the preferred form of my invention, this dividend entry mechanism will be utilized to cause shifting of the carriage to the proper ordinal position for the extraction of square root, as determined by the decimal point of the radicand. That is, the radicand can be inserted in the keyboard with the carriage in any starting position, and the depression of a square root initiating key will cause the register dials 22 and 23 to be cleared, the carriage to be shifted to the proper position, the radicand factor that is set in the keyboard to be entered into the accumulator dials five times, and the extraction operation to be initiated.

Figure 2:
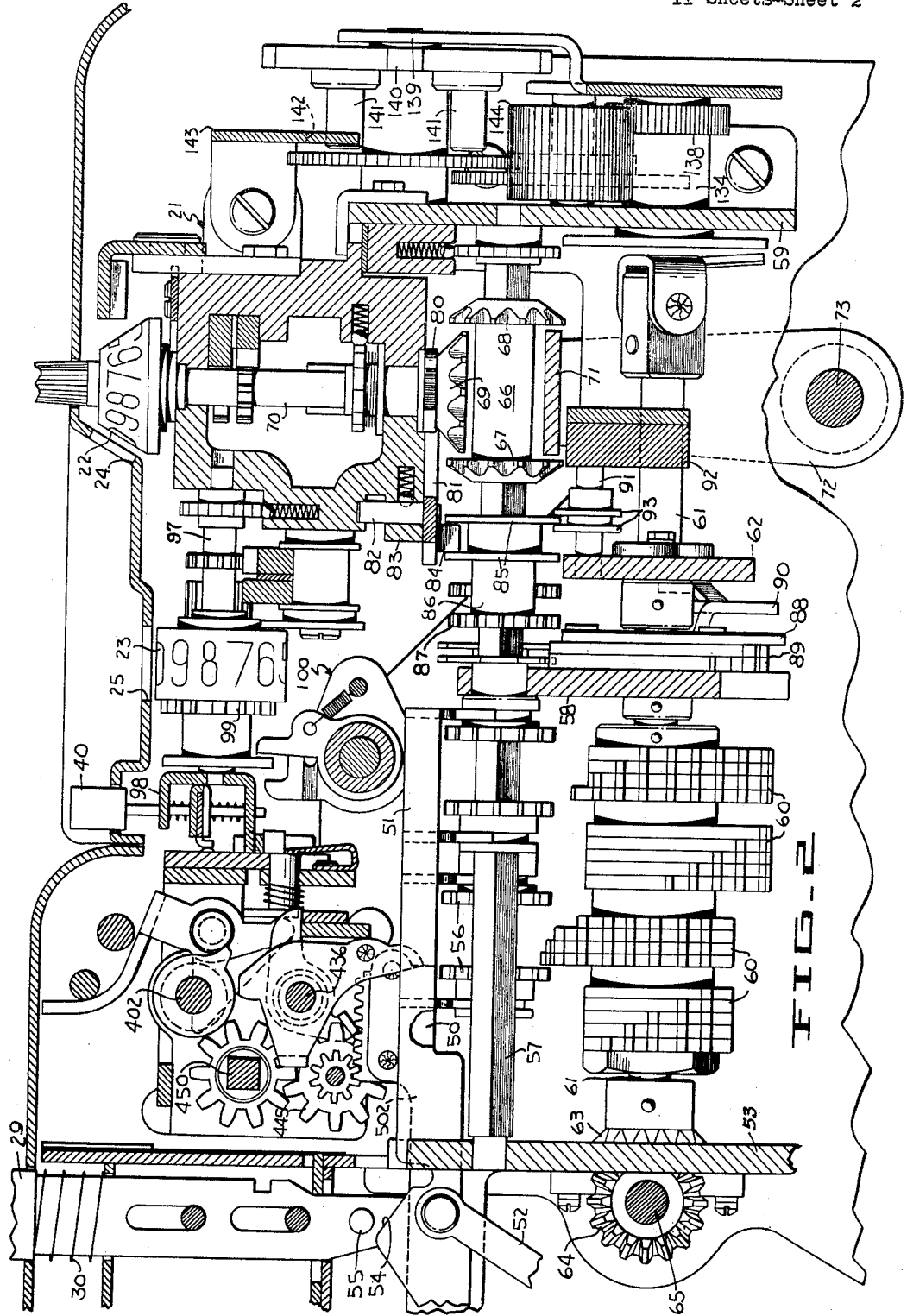
FIG. 2 is a longitudinal cross-sectional view of the machine with certain parts broken away in order to more clearly show the conventional selection and actuating mechanisms and the carriage containing the accumulator and counter dials, and showing in addition, a cross-sectional view of the square root control mechanism of my invention, taken on a plane between the first and second orders thereof.

The values to be entered into the accumulator numeral wheels 22 may be determined by means of a plurality of similar selecting mechanisms associated with the amount keys 29. As shown in FIG. 2, each bank of amount keys cooperates with a pair of similar value selection bars 50 and 51, which are mounted for endwise movement by means of a suitable supporting linkage including struts 52, the bars extending through suitable slots provided therefor in the forward crossbar 53. Each selection bar is provided with a plurality of cam faces 54 which are engaged by pins, or studs, 55 carried in the lower ends of the value keys 29. The bar 50 carries such cam faces for operation by the "1" to "5" keys, while the bar 51 is operated by the "6" to "9" keys.

Each selection bar 50 and 51 is provided at its rear end with an integral yoke that engages the grooved collar of a ten-tooth selection gear 56, slidably and nonrotatably mounted on a longitudinally extending square shaft 57 journalled in the cross-bars 53, 58 and 59. Hence, the longitudinal movement of the bars 50 or 51, as differentially controlled by a coordinal numeral key 29, serves to position the selection gears 56 in the path of a series of stepped teeth provided on an actuating cylinder, or drum, 60 secured to a shaft 61 journalled between the crossbar 53 and a transverse supporting bracket 62. For each adjacent pair of key banks there is provided one longitudinally extending actuator shaft 61 bearing a pair of actuating drums 60. Each actuating shaft 61 is provided at its forward end with a bevel gear 63 which meshes with a corresponding bevel gear 64 secured to a transverse power shaft 65 journalled between the side frames of the machine. The shaft 65 is cyclically and unidirectionally operated by means of a clutch controlled driving means, so as to provide a single path of power flow from the electric driving motor to the various power-operated mechanisms of the machine.

Each of the square shafts 57 carries, on its rear end, a slidably but nonrotatably mounted spool 66 to which is secured a ten-tooth add gear 67 and a ten-tooth subtract gear 68, which gears are adapted to cooperate with similar ten-tooth gears 69 secured on the lower ends of the accumulator numeral wheel shafts 70.

When the machine is in its idle, or full-cycle position, the gears 69 lie midway the add and subtract gears 67 and 68, so as to permit lateral shifting movement of the carriage. The gears 69, in this case, are free to pass through the space existing between the gears 67 and 68.

In order to enable an amount set up on the keys 29 to be added into the accumulator wheels 22, the spool 66 and the integral gears 67 and 68 are shifted toward the rear of the machine (clockwise in FIG. 2), so as to engage the add gears 67 with the accumulator wheels 69. This shifting of the gears is accomplished by means of a flat bar, or gate, 71 extending transversely of the machine and lying within the space provided between the add-subtract gears 67, 68. The gate 71 is supported at either end by a pair of similar arms 72 secured to a transverse gate shaft 73 journalled in the side frames of the machine. The shaft 73 may be rocked (clockwise as viewed in FIG. 2), in a manner hereinafter to be described, so as to cause engagement of the add gears 67 with the gears 69 or, alternatively, the shaft 73 may be rocked counter-clockwise so as to result in engagement of the subtract gears 68 with the gears 69.

A more complete description of the preferred form of the selection and actuating mechanisms can be found in the patents referred to herein. As these mechanisms are old and do not directy relate to the present invention, it is believed that the above brief description will be adequate for this phase of machine operation.

Secured to the lower end of each of the numeral wheel shafts 70 is a tens-transfer cam 80 which is adapted to cooperate with a transfer lever 81, the lever being mounted on a bearing stud 82 which is journalled in the main frame bar 83 of the carriage. On the outer end of the transfer lever 81 there is provided a downturned ear 84, which lies between a pair of flanges 85 provided on the hub 86 of a tens-transfer gear 87 located in the next higher order of the machine. The hub 86 and the gear 87 are slidably, but nonrotatably, mounted on the square shaft 57, whereby rotation of the gear 87 will be transmitted through the add-subtract gears 67, 68 to the numeral wheel shaft 70. Whenever the accumulator wheel 22 passes from "0" to "9," or from "9" to "0," a nose on the transfer cam 80 will rock the transfer lever 81 and move the ear 84 forwardly, so as to move the transfer gear 87 of the next higher order into the path of a single transfer actuating tooth 88 formed on a disk 89 secured to the actuator shaft 61. The single tooth 88 will thereby cause one step of movement to be given to the square shaft 57 in addition to the normal movement imparted thereto by the actuating drum 60. The accumulator wheel 22 will thus be advanced one step so as to effect the tens-transfer from one order to the next higher order as required.

After the tens-transfer has been effected, the transfer gear 87 will be restored to its normal position by means of a restoring cam 90 secured to the actuator shaft 61. This restoring cam operates on the forward end of a detent pin 91 which is mounted for sliding movement in the bracket 62 and a transverse supporting bracket 92. The pin 91 carries a pair of spaced flanges 93 which embrace one of the flanges 85 provided on the hub 86 of the transfer gear 87, so that when the pin is cammed rearwardly, the gear 87 will be restored to its normal position.

As shown in FIG. 2, each of the revolutions counter numeral dials 23 is secured to a longitudinally extending shaft 97 journalled at its rear end in the carriage frame bar 83 and at its forward end in a channel bar 98 which form a part of the framework of the carriage 21. Secured to each of the shafts 97 is a gear 99 which is arranged to cooperate with a revolutions counter actuating mechanism 100 for operating the numeral wheels 23 in such a manner as to provide a count of the cyclic operation of the calculating machine and also for causing a unit to be transferred from a lower order to a higher each time a counter dial 23 passes through "0."

Means are provided for shifting the carriage 21 selectively in either direction through one or more ordinal spaces, and the shifting means is preferably operated from the actuator shaft 61, and can be controlled by manually depressible shift keys 27 and 28 (FIG. 1). These keys and the mechanism controlled by them are fully shown and described in U.S. Patent No. 2,380,642, issued to Carl M. F. Friden et al. on July 31, 1945. The manually controlled shifting mechanism is conventional and has no particular connection with the mechanism of my invention so will be only briefly described.

Figure 3:
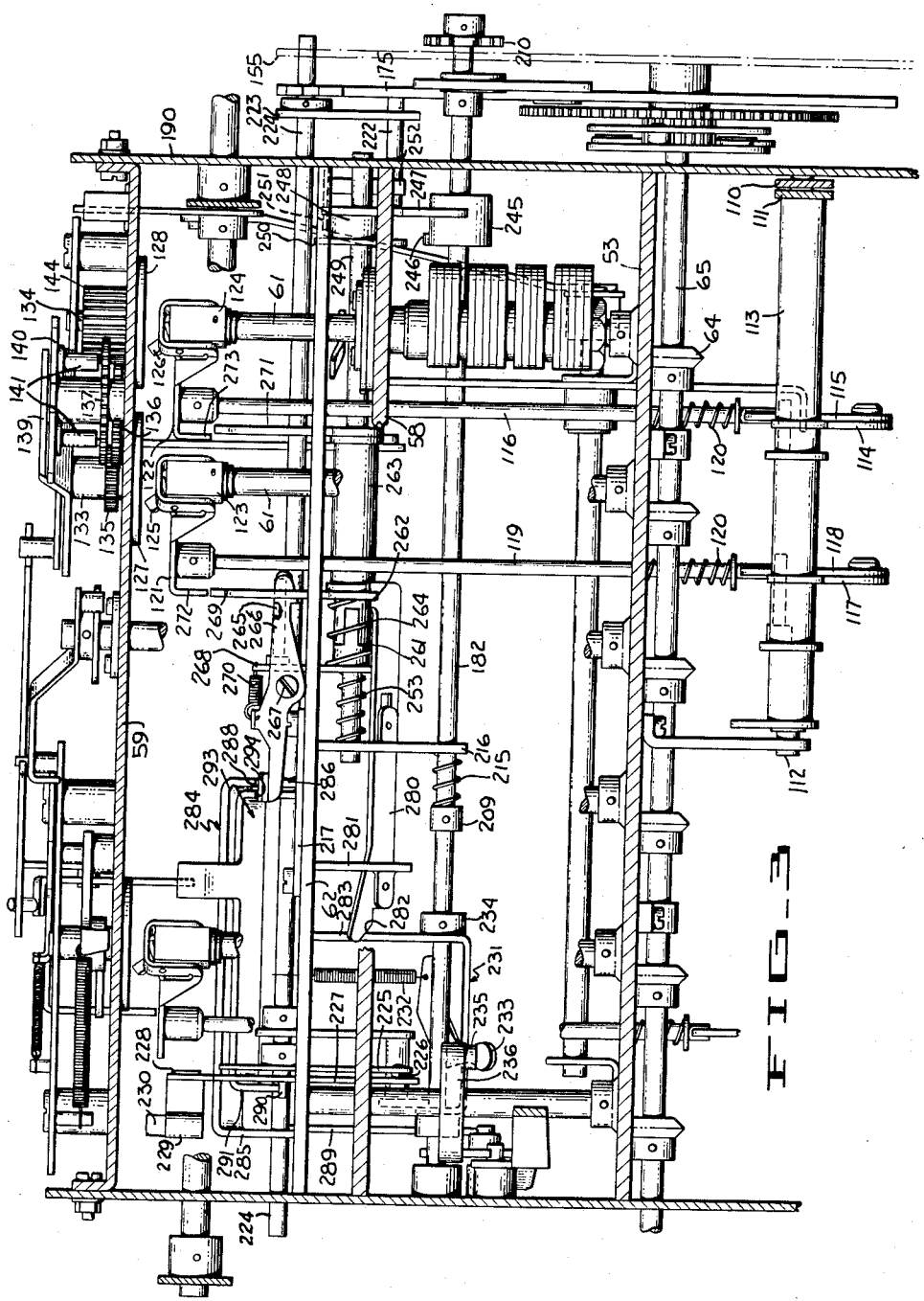
FIG. 3 is a plan view of the division control and division aligning mechanism of the machine with which my invention is preferably associated.

The shift keys 27 and 28 rock levers 110, or 111, respectively (see FIG. 3). The levers are respectively secured to the left shift shaft 112 and a sleeve 113. An arm 114 is mounted on the sleeve 113 and carries a rearwardly extending link 115 provided with a pressure face, not shown, engaging the forward end of the right shift rod 116. Similarly, an arm 117 is mounted on the shaft 112 and carries a pusher link 118 engaging the front end of the left end shift rod 119. Thus, depression of either shift key 27 or 28 rocks the arm 117 or 114, respectively, which, in turn, moves the left shift rod 119, or the right shift rod 116, rearwardly to cause engagement of the shift clutches, as hereinafter described.

The push rods 119 and 116 are normally maintained in a forward, or inactive, position by means of compression springs 120, while the rear end of the rods, as shown in FIG. 3, respectively, carry shifting forks 121 and 122, which engage adjacent angularly adjustable clutch members 123 and 124. The members 123 and 124 are pivotally mounted on the rear ends of the two rightmost actuator shafts 61 and are provided with clutch teeth 125 and 126 which engage corresponding notches provided in respective disks 127 and 128 mounted on the forward ends of gear sleeves 133 and 134. When either the clutch member 123 or the clutch member 124 is rocked rearwardly by its associated shift fork 121 or 122, the tooth 125 or 126 will engage in the notch provided in the respective disk 127 or 128. Hence, it will be seen, that the coupling members 123 and 124 provide a means whereby the actuator shafts 61 may be selectively coupled to the gear sleeves 133 or 134, and thereby provide a power drive of the carriage shift mechanism. For example, depression of the left shift key 27 moves the push rod 119 and the shift fork 121 toward the rear of the machine and thereby causes the coupling member 123 to establish a drive connection from the second rightmost actuator shaft 61 to the gear sleeve 133. In a similar manner, depression of the right shift key 28 moves the shift rod 116 and the shift fork 122 rearwardly to establish a driving connection between the rightmost actuator shaft 61 and the gear sleeve 134.

As seen in FIG. 3, the gear sleeve 133 carries a gear 135 which meshes directly with a larger gear 136. A smaller gear, not shown, but which is secured to gear 136, meshes with a shift gear 137 (FIGS. 2 and 3). The gear sleeve 134 carries a gear 138 which meshes with a wide idler gear 144, and that, in turn, meshes with the large gear 136 and causes a reverse rotation of this gear. The gear sizes are so chosen as to provide a drive ratio of 1:4 between the gears 135 and 138 and the shift gear 137, so that each rotation of the gear sleeve 133 or 134 causes the shift gear 137 to be rotated through an angle of 90°.

The shift gear 137 is secured to a shaft which is journalled between the crossbar 59 and a plate 139 mounted on the rear of the machine. Secured to the same shaft as the gear 137 is a drive plate 140 which carries four equally spaced drive pins 141 which are adapted to engage notches 142 (FIG. 2) provided in a shift rack 143 secured on the rear of the carriage 21. Hence, for each 90° of rotation of the drive plate 140, the carriage will be shifted through a distance equal to the spacing between the notches 142, which is equal to the distance between the numeral wheel shafts 70 (FIG. 2). In other words, the carriage will be shifted one ordinal space in each cycle of operation on the power shaft 65.

The mechanism just described is modified as shown in the patent of Machado et al. No. 2,653,765 to provide for automatic shifting of the carriage to the right upon depression of the division key 38. This shifting continues until the dividend in the carriage is properly aligned with the divisor set in the keyboard. Thereafter, the division mechanism automatically controls shifting of the carriage to the left, order-by-order as the division progresses.

The operation of the automatic division mechanism controls the functioning of the machine so as to cause the divisor to be repeatedly subtracted from the dividend until an overdraft occurs in the accumulator. Thereupon, the ovedraft will be corrected and the carriage shifted one ordinal space to the left, after which the process will be repeated. The number of subtraction cycles effected in each order of the accumulator is registered in the revolutions counter so as to provide a visual representation of the quotient at the end of the problem. During division the machine is controlled by a program control device which becomes effective each time an overdraft occurs in the accumulator. This program device controls the program of operation of the add-subtract gears and the carriage shift mechanism so as to cause a predetermined sequence of operations to occur during the uninterrupted cyclic operation of the actuating mechanism of the machine. The division operation is normally initiated by the depression of the division key 38 which causes the program control device to be operatively connected with the add-subtract gate and also with the carriage shift mechanism and, in addition, renders the overdraft control mechanism effective to control the cycling of the programming device.

Figure 4:
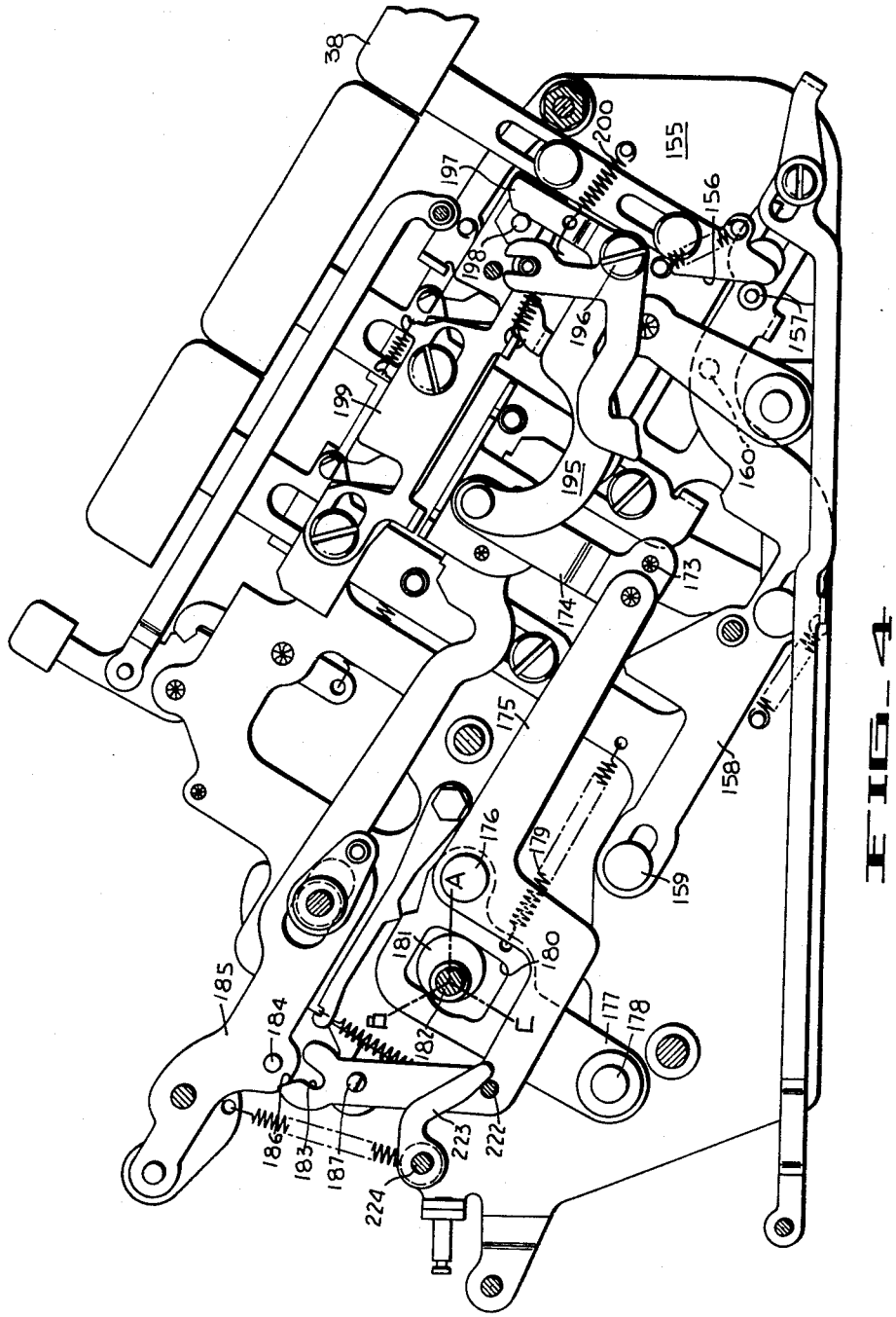
FIG. 4 is a left side view of the right-hand control plate with the carriage omitted, showing particularly the division mechanism of the machine in which the preferred form of my invention is associated.

As shown in FIG. 4, the division key 38 is slidably mounted on the control plate 155 by means of slots in the key stem which cooperate with rivets or studs secured to the control plate, so as to guide the key for vertical reciprocatory movement. The key is provided at its lower end with an inclined cam face 156 which bears against a roller 157 mounted on a division slide 158. This slide is supported for endwise shifting movement on the control plate 155 by means of elongated slots in the slide which cooperate with studs 159 secured to the control plate. As shown in FIG. 5, the slide 158 is provided with a roller 160 which lies in front of a finger 161 formed on the upper end of the latch 162 pivotally mounted at 163 on the right side of the control plate 155. The latch 162 is urged forwardly (in a counter-clockwise direction in FIG. 5) by means of a spring 164 tensioned between the lower end of the latch and a stud 165 mounted on the control plate, so as to normally maintain a shoulder 166 formed on the latch beneath a roller 167 secured to the forward end of a division setting actuator 168. The actuator 168 is pivotally mounted on the control plate 155 and its front end is urged downwardly (in a counter-clockwise direction in this figure) by means of a strong spring 169 which is tensioned between the actuator and the stud 165. The roller 167 is thereby maintained in engagement with the shoulder 166 of the latch, when the parts are in a normal position. However, when the division key 38 (FIG. 4) is depressed, the cam face 156 will engage the roller 157, thereby moving the slide 158 rearwardly. Such movement of slide 158, in turn, causes the roller 160 to engage the finger 161 and rock the latch 162 rearwardly (clockwise in FIG. 5), to remove the shoulder 166 from beneath the roller 167 of the actuator 168. The actuator will thereupon be rocked counter-clockwise by the strong spring 169, so as to cause the setting of the division control mechanism, hereinafter to be described. The actuator 168 will be restored during the first cycle of operation of the machine by means of a roller 170 mounted on a disk 171 secured to the face of an idler gear 212. The roller 170 is adapted to engage an inclined cam face 172 formed on an upwardly extended arm of the actuator 168, so as to cause the actuator to be rocked clockwise against the tension of the spring 169, when the machine is cycled.

Lying beneath the forward end of the actuator 168 is a roller 173 (see also FIG. 4) which is mounted on the lower end of a link 174 that is pivotally connected to the forward end of a connecting lever 175. This lever is pivotally mounted on a stud 176 carried by a cam follower arm 177 which is pivotally mounted on the control plate 155 at 178 and is urged forwardly (in a clockwise direction as viewed in FIG. 4) by means of a spring 179. The arm 177 is provided with an aperture 180, within which is located an eccentric cam 181 mounted on a program control shaft 182. As described in the aforementioned Patent No. 2,327,981, this shaft forms an essential part of the program controlling device and is rotated during division operations to control the setting of the add-subtract gate and the operation of the carriage shift mechanism. These operations are performed in a predetermined sequence so as to cause the machine to carry out a division operation during continuous cycling of the machine.

The lever 175 is provided on its read end with a notch 183 for engaging a stud 184 secured to the gate setting slide 185. Thus, when the division key 38 is depressed to release the actuator 168 (FIG. 5), the roller 173 will be depressed and the connecting lever 175 will be rocked (clockwise as viewed in FIG. 4), thereby causing an inclined face 186 on the rear side of the notch 183 to engage the stud 184 and cam the slide 185 forwardly. Such movement causes the subtract gears 68 to engage the gears 69 on the shafts 70 and thereafter causes stud 184 to become seated in the bottom of notch 183. The connecting lever 175 thereby serves as a connection between the follower arm 177 and the gate setting slide 185, whereby movements of the arm 177 will be communicated to the slide for the purpose of controlling the add-subtract gears during division operations.

The connecting lever 175 is retained in its operated position, throughout the division operation, by means of a half-round stud 187 (FIG. 4) mounted in the rear end of the lever 175, which stud is adapted to be engaged by a latch 188 (see FIG. 5) pivotally mounted on a stud 189 mounted on the right side frame 190. The latch 188 is urged into latching engagement with the stud 187 by means of a tension spring 191. Thus, when the lever 175 is rocked upwardly (clockwise in FIG. 4 and counter-clockwise in FIG. 5), the latch will engage beneath the stud 187 and hold the connecting lever in its operating position until the latch is released at the end of the division operation.

In order to initiate cycling of the machine during a division operation, the link 174 (FIG. 4) is pivotally connected at its upper end to the rear end of a bellcrank lever 195 which is pivotally mounted on a screw 196 secured to the control plate 155. This bellcrank is provided with an upstanding arm 197 which lies in front of a stud 198 mounted on a cycle-initiating slide 199. Hence, when the link 174 is depressed upon the release of the actuator 168 (FIG. 5), the bellcrank 195 will be rocked (counter-clockwise in FIG. 4) against the urgency of a spring 200, thereby causing slide 199 to be moved toward the rear of the machine so as to engage the clutch and to close the motor contacts of the machine. The bellcrank 195 is retained in its operative position throughout the division operation as it is connected to the latched connecting slide 175.

It will be observed (FIGS. 3 and 5) that the program control shaft 182 extends through the control plate 155 and is provided at its right-hand end with a mutilated gear 210 which is adapted to be moved axially into, and out of, meshing relationship with a larger mutilated gear 211 secured to a gear 212 journalled on a screw 213 mounted on the control plate. The gear 212, in turn, meshes with a gear 214 secured on the right-hand end of the power shaft 65, so that when the clutch is engaged and the shaft 65 rotated, the gear 214 will drive the gear 212 and the large mutilated gear 211. The small mutilated gear 210 is normally located out of the plane of the gear 211, so that the program control shaft 182 is normally inoperative. As shown in FIG. 3, the shaft 182 is normally urged toward the left, as viewed from the front of the machine, by means of a spring 215 on the shaft 182, which is compressed between a collar 209 on the shaft and an arm 216 of a bracket 217 secured to the crossbar 62. Hence, the gear 210 is urged to a position where it lies against the right-hand side of the control plate 155, with a notch formed in the periphery of the gear engaging a pin 218 mounted in the control plate 155. By means hereinafter to be described, the shaft 182 and the gear 210 are shifted to the right at certain times during a division operation so as to move the gear into the plane of the large mutilated gear 211 and thereby establish a driving connection to the shaft 182 from the transverse power shaft 65.

The gear 210, as seen in FIG. 5, has three equally spaced sets of three teeth each, which are arranged to cooperate with a single set of two teeth provided on the gear 211. As the latter gear rotates in a counter-clockwise direction during cycling of the machine, its two teeth are so positioned thereon as to engage with one of the sets of three teeth on the gear 210 just before the end of a machine cycle. Hence, when the small mutilated gear 210 is projected into the plane of the larger gear 211 during the course of a division operation, the small gear 210 will be rotated clockwise through one-third of a revolution at the end of the instant cycle and also through one-third of a revolution at the end of each of the two next succeeding cycles, the gear 210 and the shaft 182 being maintained in their right-hand position by the engagement of the pin 218 with the left-hand face of the gear 210.

The connecting lever 175 (see FIG. 4) bears a stud 222 which lies beneath the forward end of an arm 223 secured to a laterally extended shaft 224 (see also FIG. 3), which is journalled between the control plate 155 and the left side frame of the machine. Also secured to the shaft 224 at the left-hand side of the machine is an arm 225 which is provided at its forward end with a stud 226 projecting into an elongated slot provided in the lower end of an overdraft control link 227. This link is pivoted at its upper end on a stud 228 secured to a yoke 229 which is fastened on an extension 230 of the highest order tens-transfer detent pin 91. As mentioned earlier, when a transfer is effected from one order of the accumulater to the next, the pin 91 will be moved forwardly as an incident to the forward movement of the transfer gear 87 for the purpose of placing this gear in the path of the transfer actuating tooth 88. Hence, when a transfer occurs which effects a forward movement of the leftmost detent pin 91, the extension 230 thereof will cause the link 227 to be moved forwardly.

The forward end of the link 227 is normally held in its depressed, or inactive, position by a spring, not shown. However, upon depression of the division key and the rocking of the connecting lever 175, the shaft 224 will be rocked counter-clockwise, as viewed in FIG. 4, thereby causing the pin 226 to lift the forward end of the link 227 so that it will lie directly behind the lower edge of a division control flag 231 which is pivotally mounted on the control shaft 182. Then, when the link 227 is moved forwardly, as a result of a forward movement of the leftmost detent pin 91, the flag will be rocked (clockwise, as viewed from the right) against the urgency of a spring 232, so as to move an upwardly extending finger 233 on the flag into the plane of a pin 235 carried by a disk 236 which is mounted on the leftmost actuator shaft 61. Hence, as the shaft 61 rotates, the pin 235 will engage the finger 233 and displace the flag 231 (to the right, as viewed in FIG. 3). Inasmuch as the flag is prevented from moving laterally on the shaft 182 by means of a collar 234 which is pinned to the shaft 182, this shaft and the small mutilated gear 210 will likewise be displaced to the right so as to bring the gear 210 into the plane of the larger gear 211. Thus, the shaft 182 and the cam 181 fixed thereon (FIG. 4) will be given a 120° movement during each of the next three cycles of the machine, after which the gear 210 will drop back over the pin 218 to its inactive position. In the meantime, the overdraft control link 227 will be moved rearwardly in the first of these three cycles so as to release the flag 231, due to the restoration of the detent pin 91 by its restoring cam 90.

When the cam 181 (FIG. 4) occupies its normal position, marked "A," which is the position of the cam when the notch on the small mutilated gear 210 engages the pin 218, the connecting lever 175 will be so positioned as to hold the gate setting slide 185 in its forward position, thereby causing the subtract gears 68 to engage the accumulator gears 69 on the numeral wheel shafts 70. The machine will, therefore, be set for subtraction, and the value of the divisor set in the amount keys 29 will be subtracted from the accumulator wheels 22 each time the machine makes one cycle of operation. Toward the end of the cycle in which the overdraft occurs in the accumultaor, the shaft 182 will be displaced toward the right under the control of the transfer mechanism, as described above. Such displacement positions mutilated program gear 210 in the plane of its drive gear 211. The teeth of the gear 211 engage the teeth of the mutilated gear as the large gear approaches its full-cycle position (shown in FIG. 5). Thus, as the cycle ends, the shaft 182 is rotated counter-clockwise 120° to the position marked "B," whereupon the cam 181 will rock the follower arm 177 (counter-clockwise in FIG. 4), thereby moving the connecting lever 175 toward the rear of the machine and causing the add gears 67 to be moved into mesh with the accumulator gears 69. Therefore, during the following cycle of operation of the machine, the divisor will be added into the accumulator so as to correct the overdraft. At the end of this cycle, the program control shaft 182 will be rotated through another 120° to the position marked "C," thereby moving the arm 177 to an intermediate position in which the add-subtract gears 67 and 68 are held out of engagement with the accumulator gear 69 during the cycle required for a carriage shifting operation.

In order to cause a carriage to be shifted one ordinal position to the left during the machine cycle following movement of the shaft 182 to the position "C," a cam 245 (FIG. 3) is secured to the program shaft 182, this cam being provided with a node 246. When the shaft 182 is moved toward the right by the action of the pin 235 on the flag 231, the node 246 on the cam 245 is moved toward a follower arm 247 which is secured to a hub 248 pinned to a shift shaft 249, the rocking of which initiates either a right or left shift (depending upon the position of a sleeve 263). This shaft is arranged to receive axial shifting movements, as will be hereinafter described. The hub 248 is provided with a flange 250, which, together with the follower arm 247, provides an annular groove for receiving a finger 251 provided on a bellcrank lever, not fully shown. The bellcrank lever is provided with a forwardly directed arm 252 which lies over the left-hand end of the stud 222 carried by the lever 175. Hence, when the lever 175 is rocked (clockwise as viewed in FIG. 4), the stud 222 will cause the arm 252 to be lifted and thereby rotate the bellcrank (counter-clockwise as viewed from the front of the machine) so as to move the shaft 249 and the follower arm 247 to the left against the opposition of the compression spring 253 mounted on the shaft 249 at the left-hand end thereof (see FIG. 3). This leftward movement of the follower arm 247 is sufficient to bring the arm into the plane of the node 246 when the shaft 182 occupies its active, or right-hand, position. The node 246 is so located on the cam 245 as to cause the follower arm 247 to be rocked, and held in the rocked position, when the cam 181 (FIG. 4) occupies the position marked "C." Through means to be described, this rocking movement of the arm 247 and shaft 249 causes the right shift clutch to be engaged during the aligning phase of a division operation and the left shift clutch to be engaged during the division phase, and thereby cause the carriage to be moved one ordinal space. At the end of the shift cycle, the cam 181 will be moved from position "C" to position "A" to again cause the subtract gears 68 to be engaged with the accumulator gears 69, to again cause the divisor to be subtracted from the dividend. When the cam 181 and shaft 182 reach the position marked "A," the notch in the small mutilated gear will again register with the pin 218 and permit the gear and the shaft to be moved to its left under the influence of the compression spring 215 (FIG. 3). This terminates the operation of the program control shaft 182 until the repeated subtraction of the divisor once again causes an overdraft in the accumulator, whereupon the program control mechanism will once again be set into operation to cause the above-described sequence of operation of the machine.

The calculating machine is provided with a counter reversing key 39 (FIGS. 1 and 5) which lies immediately adjacent the division key 38 and is normally depressed along with this key when a division operation is initiated. Normally the counter actuator 100 operates in the same sign character direction as the accumulator, or product, register—the counter actuator being connected to the plus-minus gate 71 by conventional means shown in FIG. 5. This mechanism is not pertinent to the present invention, and thus will not be described.

It can be noted, however, that depression of the key 39 causes the revolutions counter to be operated in a reverse, or unlike, direction, by causing the subtraction cycles occuring during the division operation, to be counted in a positive sense.

The division aligning mechanism used in the Friden fully automatic calculating machine is that based on the patent of Anthony B. Machado, No. 2,653,765 mentioned before. This mechanism is operative in the first phase of the operation of the division mechanism to automatically shift the carriage to the right until the divisor has been properly aligned with the dividend. This division aligner mechanism is important to the initiaton of a square root extracton in the proper order, and will, therefore, be briefly described. A square root initiating key aligned with the decimal point of the radicand is depressed, which will cause the carriage to automatically shift to the proper order for the insertion of the radicand factor into the register. Then, depending upon whether the decimal point is to the right of an odd or an even order of the machine, the carriage may be shifted an additional step to properly align the radicand factor with the ninth order of the keyboard and its associated selection mechanism.

It will be recalled that it was mentioned in the description of the division programming mechanism that the rotation of program shaft 182 to the "C" position operated through cam 245 (FIG. 3) and cam follower arm 247 to rock the shift control shaft 249. Normally, the rocking of the shaft 249 is operative to move the left shift clutch 123 to the rear to engage the sleeve 127 for one cycle, or until the program shaft 182 returns to its "A" position. However, the rocking of the connecting lever 175 at the initiation of a division operation shifts the shaft 249 to the left. This is accomplished by means of the long pin 222 mounted on the connecting link 175 which rocks the forward arm 247 of the bellcrank, the nose 251 of which bellcrank lies within the flanges formed by the arm 247 and the flange 250. Thus, the operation of the connecting link 175 is effective to shift shaft 249 to the left. The shifting of the shaft 249 is operative to disable the means for controlling operation of the left shift clutch 123 and enables mechanism for operating the right shift clutch 124, upon the rocking of the follower arm 247. The division aligning mechanism is shown particularly in FIG. 3 and includes a means for selectively engaging either the left shift or the right shift clutches from the rotation of the program shaft 182 and the rocking of the follower arm 247.

The shaft 249 is journalled in the right side frame 190 and in the arm 216 of the bracket 217. It is resiliently urged to the right by a suitable compression spring 253. Secured to the shaft 249 is a male driving element 261 which engages a slot in a driven element 262 loosely mounted on the shaft 249. The driven element 262 is mounted, however, on the left-hand end of sleeve 263, also rotatably journalled on the shaft 249. The sleeve 263 is resiliently urged to the right by means of a light compression spring 264, but is restrained against such movement by a pair of latches 265 and 266 which are pivotally mounted on a screw 267. The screw 267 is mounted in a bracket 268 carried by the shaft 249, whereby the latches shift to the left with the initial movement of the shaft 249 at the initiation of the division operation. The latches 265 and 266 are provided with latching shoulders which are adapted to engage and hold an abutment face provided on a left shift arm 269, which is rigidly mounted on the left end of sleeve 263. The latches 265 and 266 are urged into engagement with the abutment face of the left shift arm 269 by suitable springs 270, as shown. A right shift arm 271 is also secured to the sleeve 263, being mounted on the right end thereof.

The rear ends of the arms 269 and 271 are provided with cam faces which are adapted, upon rocking of the sleeve 263, to engage the corresponding faces provided on ears 272 and 273, respectively, formed on the shifting fork 121 and 122, thus pushing the respective forks to the rear to clutch-engaging position. When the machine is in its normal, or home, position, the left shift arm 269 is in alignment with the ear 272, while the arm 271 lies to the right of its associated ear 273, and is, therefore, in an inoperative position with respect to the shifting fork 122 which controls the right shift of the machine.

It has previously been mentioned that initiation of a division operation causes a shifting of the shaft 249 (FIG. 3) to the left, thereby moving the latches 265 and 266, which are indirectly carried by the shaft 249, toward the left. The latches, in turn, pull the sleeve 263 toward the left to align the right shift arm 271 with the ear 273. Thereupon, the right shift clutch will be operated upon rocking of the sleeve 263, and the arm 269 is moved out of alignment with the ear 272 (thereby disabling operation of the left shift clutch). By this means, the rocking of the shaft 249, under the control of the programming shaft 182 as above mentioned, is effective to cause a right shift of the carriage instead of a left shift during the aligning phase.

Also the shifting of the shaft 249 toward the left is operative to move a slide 280 which is mounted for lateral sliding movement on brackets 281 and 216. The right end of slide 280 is notched to embrace the edge of the left shift arm 269, so that the shifting of the sleeve 263 likewise shifts the slide 280 to the left. The left end of slide 280 is provided with an inclined camming face 282 which overlies a tail 283 on the flag 231. Hence, when the sleeve is shifted to the left, along with the shaft 249 at the beginning of a division operation, the slide 280 will likewise be shifted to the left and cam face 282 will cam the tail 283 downwardly, thereby rocking the finger 233 on the flag into alignment with the pin 235 carried on the disk 236 which is mounted on the left-hand actuator shaft 61. The flag 231 is held in its rocked, or active, position by the slide 280, so that the program control shaft 182 will be cammed to the right during the first cycle of operation, thereby initiating operation of the division program mechanism above described, with a shift of the carriage to the right instead of to the left. At the end of the third cycle, the shaft 182 will be released for movement to the left, and immediately the flag 231 will be operated to cause it to be shifted to the right to initiate another series of programmed operations. Thus the program control shaft 182 will be repeatedly operated by a simulated, or false, overdraft caused by the rocking of flag 231 from translation of the slide 280. This shifting of the carriage to the right will be continued until both of the latches 265 and 266 have been tripped by a mechanism now to be described, so as to release the sleeve 263 to the action of its spring 264. Thereupon the left-hand shifter arm 269 will move into alignment with the ear 272 on the shift fork 121, so as to cause the left shift clutch to be engaged each time the shaft 249 is rocked. At the same time the slide 280 will be moved toward the right so as to release the tail 283 of the flag, and thereby permit the flag to be placed under control of the overdraft control link 227. Hence, once the latches 265 and 266 have been operated to release the sleeve 263, the program control mechanism will function in its normal manner to bring about an automatic division operation, i.e., cause the dividend to be divided by the divisor in a conventional manner.

The latch 266 is released by the rocking of a bail 284, the arms 285 and 286 of which are freely pivoted on the shaft 224 (see FIG. 3). This bail is provided on its right-hand arm 286 with a finger 288, the upper end of which lies behind the left-hand end of the latch 266. Thus, the rocking of bail 284 (counter-clockwise when viewed from the right) will release the latch 266. The bail is operated by means of the arm 285 thereof, which is pivotally connected to a link 289 that is operated by a mechanism which senses the "0" or non "0" condition of the left-hand register dials 22. This sensing mechanism is not here shown but it is believed sufficient to mention that the sensing mechanism is so constructed that when the carriage is in its extreme right-hand position, it will rock the bail 284 and release the latch 266.

It can be also mentioned that the latch 266 is somewhat shorter than the latch 265, so that when the latch 266 is released the spring 264 will cause the sleeve 263, and shift arms 269 and 271 secured thereto, to escape slightly to the right until it contacts the latching face of the longer latch 265. Consequently, once the sensing mechanism for the numeral wheels has been artificially caused to sense a "0," the shifter arms and sleeve 263 will be permitted to escape slightly to the right, so as to thereafter be under the sole control of the longer latch 265 only.

The latch 265 is adapted to be released under the control of the highest order transfer pin 91. For this purpose the overdraft control link 227 (FIG. 3) carries a stud 290 which lies above an arm 291 formed on the left end of a bail 293, which, like the bail 284, is freely pivoted on shaft 224. The arm 291 is provided with a suitable nose, not shown, which is adapted to be engaged by the pin 290 when the link 227 is moved forwardly in response to a tens-transfer affecting the highest order transfer pin 91. The arm 291 will thereby be rocked (counter-clockwise when viewed from the right). At its right end the bail 293 is provided with a finger 294 which lies behind the left-hand end of the long latch 265. When a transfer occurs which affects the highest order pin 91, the finger 294 will be moved forwardly and so rock the long latch 265, thereby releasing the sleeve 263 and the shift arms 269 and 271 to the influence of the spring 264. Thereupon the assembly shifts to the right, so as to bring the arm 269 into line with the ear 272 on the left shift fork 121. This will effectively reverse the direction of the carriage shift under the control of the program control mechanism and, at the same time, will cause the slide 280 to release the tail 283 on the flag 231, so as to enable the flag to be controlled by the overdraft control link 227 in the conventional manner. The division control mechanism will thereafter operate in a normal manner until the carriage reaches its extreme left-hand position, where the carriage will be disabled.

In my preferred form of square root extraction the radicand value is set into the left-hand keys of the keyboard, with the keyboard decimal point marker set in the proper place. A square root control key aligned with the decimal point of the radicand is depressed to initiate the extraction of square root. It will be understood that the depression of any of the square root keys first automatically controls the entry of the radicand factor set in the keyboard into the proper order of the accumulator, and then initiates the extraction phase of the operation.

A plurality of decimal point, or square root, initiating keys 300 are ordinarily arranged across the keyboard, forwardly of the numeral keys 29. Each key 300 is aligned with the respective decimal point marker, such markers lying between the orders of the keys of the keyboard and to the right of the rightmost and to the left of the leftmost orders. In my preferred construction, the keys 300 to the right of the odd-numbered orders of the keyboard, i.e., to the right of the first, third, fifth, etc., orders, are effective to initiate the entry of the radicand factor with the carriage positioned in the extreme right-hand position, or what is commonly called, in connection with the Friden machine, as the "ninth" tabulator position. On the other hand, the square root initiating keys 300 to the right of the even orders of the keyboard, i.e., the second, fourth, etc., are operative to initiate the entry of the radicand factor with the carriage in the next to the extreme right-hand position, commonly referred to as the "eighth" tabulator position.

The depression of a square root key 300 in line with the decimal point will, through linkage not shown but described fully in my above-mentioned Patent No. 2,736,494, initiate a dividend entry operation by automatic depression of the dividend entry key 41. The depression of this key initiates operation of a program control mechanism which includes shifting of the carriage to the extreme left-hand position, clearing both registers in that ordinal position, and then initiating a shift of the carriage to the right to the preselected ordinal position. Upon reaching this position, in conventional operation, the value standing in the keyboard is entered once in the accumulator dials 22 and the mechanism is automatically disabled. However, the square root key 300 also conditions an entry control link to latch the digitation control gate in its additive position when the tabulated position is reached, and to retain it in that operative position for four additional cycles in order to enter the radicand into the register a total of five times. The square root key also sets a clearing mechanism to operate the tabulating key mechanism in order to release any previously depressed tabulator keys 40.

All three of the above operations occur simultaneously from the rocking of a starting shaft 301 (FIG. 6). The rocking of the starting shaft 301 (which corresponds to shaft 700 in my previous Patent, No. 2,736,494) by the square root key 300 will, automatically, depress the dividend entry key 41 by means of an arm on the shaft engaging a projection on the key stem. The depression of the key 41 causes the shifting of the carriage to the desired ordinal position and clearing of both registers.

A second purpose of the rocking of starting shaft 301 is the conditioning of the dividend entry mechanism for entry of the radicand five times into the accumulator register 22 in place of the usual single entry. In other words, it is necessary to hold the dividend entry mechanism in operative position for four additional cycles of operation, and this is also controlled by the rocking of the shaft 301. The rocking of the shaft 301, however, can only condition the radicand factor control mechanism for operation, as obviously the entry of the radicand factor into the register can take place only after the carriage has been tabulated to the proper ordinal position. However, the mechanism which controls such radicand factor entry mechanism is conditioned upon the rocking of the shaft 301 and is retained in its active condition until the first cycle of additive operation controlled by the conventional dividend entering mechanism.

The conditioning mechanism is shown particularly in FIG. 6. An arm 302 is rigidly secured to the shaft 301, which shaft is pivotally mounted in a bracket 303 attached to the conventional left-hand control plate 304. This arm 302 is urged rearwardly (clockwise in FIG. 6) by a relatively strong spring 305, the spring furnishing the power for the rocking of the shaft 301. The lower end of arm 302 is provided with a pin 306 which is embraced within a slot 307 of a rocker arm 308 pivotally mounted on the control plate 304. The rocker arm 308 is provided with an ear 309 on its lower end, the ear 309 being adapted to engage the upper edge of an entry control link 310. The mechanism associated with the link 310 will not be described fully, for a full description of it can be had by referring to the above-mentioned patent, No. 2,736,494. It can be stated briefly, however, that when the control link 310 is depressed, it causes a cam edge thereon to engage (but not operate) a normally retracted and adjustable tooth 311 on a program gear 312. Thereafter, when the plus-minus gate is shifted to its additive position, the link 310 is pulled rearwardly to rock the adjustable tooth 311 into its operative position in which it is engaged by a drive gear 313. This initiates the four additional cycles of operation, through progressive positioning of the program gear 312 by the one-toothed drive gear 313. Also the link 310, when depressed, will enable a latch 314 to lock the conventional plus-minus gate setting arm 315 in its additive position when it is moved to such additive position by the conventional dividend entry mechanism, and thereby hold this gate in this position for four additional machine cycles. This will enter the dividend factor set in the keyboard four times into the accumulator dials 22 in addition to the one such entry conventional with operation of the dividend entry key 41. The radicand entry control mechanism, when latched in its operative position, is then effective to clear the keyboard of the machine and to initiate a division operation after the fifth (or fourth additional) cycle just mentioned.

The program mechanism controlling the entry of the radicand factor four additional times into the accumulator dials 22 requires a total of seven machine cycles, including the one which is normal to the dividend entry mechanism. The plus-minus gate is rocked to its additive position at the very end of the last shifting cycle, at which time the program gear 312 is conditioned for operation by the rearward translation of link 310. Then, in the following, or "first" cycle, the conventional mechanism will enter the radicand factor once into the accumulator dials 22, and about halfway through the cycle the drive gear will rotate the program gear one increment to initiate the program of four additional cycles. The radicand factor also will be entered into the accumulator dials once in the second, third, fourth and fifth cycles of programmed operation.

The force of spring 305 (FIG. 6) will hold the starting shaft 301 in its operative position until restoration of the shaft 301 to its original position, which will occur in the fourth additional, or fifth entry, cycle of the additive operation.

At the end of the fifth cycle of this programmed operation, a stud 316 on the program cycle gear 312 forces the link 310 to its forward, disabled position, and the plus-minus gate 71 will be released to return to its neutral, or centralized, position, thereby preventing the entry of a value into the accumulator register 22 during the sixth and seventh cycles.

A cam 320, shown in FIG. 6, is driven (in a counter-clockwise direction in this figure) by the program gear 312, the cam being secured to the side of an auxiliary frame plate 321, which, in turn, is secured to the left side frame 304 by means of screws 322. The cam 320 is provided with a very gradual rise equivalent to four cycles of the programmed machine operation followed by a sharp rise 323. Thus, during the course of the first four cycles (i.e., the original and the first three additional cycles) of the additive operation, the cam 320 will be rotated until the rise 323 engages a roller 324 on a cam follower arm 325 pivotally mounted on a program shaft 326. During the fifth cycle of the program operation the roller 324 will be lifted by the sharp rise 323 to a high portion 327 of the cam 320, thereby moving the follower arm 325 in a clockwise direction. The arm 325 will be retained in this position during the sixth cycle and the first part of the seventh cycle, as it rides upon the high part 327 of cam 320.

The cam follower arm 325 supports two links 328 and 329 at its lower end and also positions a programming rocker arm 330. These mechanisms serve the following purposes: Link 328 actuates the mechanism for releasing the dividend entry control during the fifth cycle of additive operation; the forwardly directed link 329 controls the clearing of the keyboard and conditions mechanism shown in FIG. 5 for the initiation of a division operation and a setting of the counter control for a true quotient; the rocker arm 330 acts as a program control to properly condition the square root programming mechanism, which follows the initiation of division but before the actual extraction of square root begins.

The rearwardly extending link 328 is pivotally secured to the lower arm of the cam follower, or rocker, 325 and is supported at its rear end by an arm 331 to which it is pivotally secured. The arm 331 is rigidly secured to a transverse shaft 332, so that the shaft 332 is rocked by cam 320 in the fifth additive cycle of operation. The rocking of this shaft releases the dividend entry mechanism so that it may be returned to its normal inoperative position. Simultaneously the plus-minus, or digitation control, gate is released from latch 314 by the forward translation of link 310. It can be mentioned at this time that a second cam, not shown herein but located behind cam 320, during the four cycle of operation will operate to restore the shaft 301 to its original inoperative position, whereby the dividend entry key 41 will be released from control of shaft 301 at this point, and thus can be restored to its inoperative position by shaft 332 during the fifth cycle.

The forwardly extending link 329 is also pivotally secured to the lower end of the follower rocker arm 325. This link is pivotally supported, at the front end of the machine, on an arm 333. The arm 333, in turn, is rigidly secured to a transverse shaft 334, the rocking of which is utilized to release the value previously set in the keyboard at the end of the fifth cycle of additive operation and to condition the division initiating mechanism for operation. The return of this link 329 to its normal position thereafter is effective to set the counter mechanism for unlike registration and initiate operation of the division mechanism.

The rocking of shaft 334 to its extreme position conditions the means for tripping division. The shaft 334 extends through the right-hand frame plate 190 (as shown in FIG. 5) and operates a linkage comprising an arm 340, a link 341 and a rocker 342. Movement of rocker 342 controls operation of a clutch control bellcrank 343 operable to hold the main clutch open, and a division initiating link 344 which will, on the initial forward movement of link 329, position the link 344 to operate the conventional division latch 162 on the return movement of link 329. The rearward movement of link 344, caused by return of link 329 and shaft 334 to their original positions, will delatch the latch 162 to start a division operation of the machine and, through engagement of the hook on its forward end with a pin on counter control lever 345, will set the counter control. A complete description of the above can be had from the above-mentioned Patent No. 2,736,494.

Means is also provided for blocking operation of the square root programming mechanism until the carriage is in its extreme right-hand position, in those cases where a shift occurs after the entry of the radicand factor. This means is under control of the delay latch means, or control lever 330, as is shown particularly in FIG. 6. The control lever 330 is also pivotally mounted on the stub shaft 326 lying immediately adjacent the follower rocker 325. This control rocker is provided at its lower end with a slot 350 which embraces a pin 351 in the follower rocker arm 325. The upper arm of the control rocker 330 carries a pin 352 which lies within a slot 353 in a control arm 354, which, in turn, is rigidly secured to a short shaft 355. The short shaft 355 carries a depending arm 356 rigidly secured thereto which is urged to the rear of the machine by a strong spring 357. The pin-and-slot connections 350 and 251 cause the control rocker 330 to follow the rocking movement of the cam follower arm 325, thereby rocking the shaft 355 (counter-clockwise in FIG. 6) against the tension of its spring 357.

The control rocker 330 carries a square latching stud 362 intermediate its length adapted to be engaged by latch member 363, the latch being pivotally secured on the frame plate 304 by a stud 364. The latch member 363 is biased into engagement with the stud 362 by a suitable spring 365. Normally, the nose of the latch 363 will ride on the square stud 362, as is shown in FIG. 6. However, as the arm 330 is rocked to its operative position at the end of the fifth cycle of the programmed operation, the latch 363 is then resiliently urged into latching engagement with the square stud, holding the arm 330 in latched position. The latch arm 363 carries a turned-over ear 366, which, when arm 363 is in latching position, will be engaged by the single-tooth drive gear 313 located on the main drive shaft 65 and will be released at about the 90° position of the drive gear. However, as the arm 330 is held at its fully rocked position by roller 324 riding on the high part 327 of cam 320, it (the arm 330) is immediately relatched in that position. Later in the sixth cycle, the stud 316 carried by gear 312 engages a gear detent 367, thereby releasing gear 312 and cam 320 to the effect of their restore spring 368. The restoration of gear 312 and cam 320 does not affect arm 330 at this time, for the delay latch 363 will not be released, and the control arm 330 is not permitted to return to its normal position by the force of its spring 357 until approximately the end of the first quarter of the seventh cycle. However, the pin-and-slot connection 350, 351 between latch arm 330 and follower rocker 325 permits the latter to be restored to its original position in the last quarter of the sixth cycle.

The restoration of follower rocker 325 initiates a division operation, for the reverse rocking of shaft 334 causes the link 344 (FIG. 5), which at this point engages a pin 346 on division latch 162, to rock the latch to release the conventional division mechanism, which is believed to be so well known that it need not be described here. The translation of link 344 also sets its counter control lever 345 for unlike registration of the counter, as is well-known in the art.

It has been mentioned that during the sixth cycle of the programming operation the cam follower rocker arm 325 and the links connected thereto are rocked back to their full-cycle position. This causes the division initiating arm 168 to rock to its operative position, although the conventional interlocks of the machine prevent actual initiation of division until the very start of the next, or seventh, cycle. During the fifth cycle of operation, the delay arm 330 will have been rocked to its extreme forward position (clockwise in FIG. 6) and then latched by the delay latch 363. This latch is released at approximately the 90° point in the seventh cycle, which, in turn, releases the shaft 355 and the mechanism controlled thereby. During the seventh and last cycle of this programmed operation, the division aligner mechanism is conditioned to shift the carriage to its extreme position, if not already there. If the carriage is in its extreme position, the aligner mechanism starts the first of three idle aligning cycles to release the right shift clutch and enable the left shift clutch.

Thus, in the seventh cycle, the shaft 355 will be rocked sharply (clockwise in FIG. 6) by means of the spring 357 tensioned between a stud on the auxiliary plate 303 and the depending arm 356 which is pinned, or otherwise secured to, the shaft 355. The rocking of shaft 355, as it is restored to its normal, or home, position, operates a mechanism which controls the square root programming mechanism. The mechanism causes a shift of the square root cam shaft of the selection programming mechanism into operative position, if the carriage is in its extreme right-hand position, and conditions a mechanism for such shifting as soon as the carriage is in its extreme position if the entry of the radicand factor occurred in the next to the last carriage position.

The mechanism comprises an arm 380 (see particularly FIG. 10) depending from, and rigidly secured to, the control shaft 355. Pivotally mounted on the lower end of arm 380 is a pusher arm 381 which is urged upwardly by a suitable spring 382 tensioned between the two arms. The pusher arm 381 extends rearwardly and at its rearward end is provided with a suitable latching shoulder 383 adapted to engage and operate a lever 384 (see also FIG. 7). The arm 381 is also provided with a stud 385 which is utilized to render the arm 381 inoperative in all operations except division. The desired control for rendering arm 381 inoperative in all operations of the machine except division is preferably secured by means of a link 386. The link 386 is provided with a turned-over ear 387 at its upper end, which ear overlies and engages the stud 385 on the arm 381. The link 386 is provided with a slot 369 which engages a spacing bar 370 to hold the link 386 in its proper position. The lower end of link 386 is pivotally secured to an arm, not shown, which is rigidly secured to the transverse division control shaft 224. The shaft 224, as mentioned above, is rocked at the very outset of the division operation, so that the link 386 is raised in all division operations, thereby permitting the arm 381 to rise to engage the arm 384, if the mechanism is set for the extraction of square root.

In a normal division operation, the arm 381 will remain inoperative to adjust the square root programming mechanism—for even though the link 386 is raised, the arm 381 will lie below the arm 384 rather than engage it. It is obvious that the shoulder 383 cannot rise to engage the edge of the arm 384 until the shaft 355 is rocked during the preliminary conditioning of the machine for the extraction of square root, which occurs in the fifth additive cycle by the rocking of delay arm 330 and shaft 355. When the shaft 355 is rocked (clockwise in FIG. 10) during the five additive cycles, the arm 381 is pulled forward and the spring 382 can lift the arm, enabling the shoulder 383 of this arm to engage the arm 384, but only after the division mechanism has been tripped. It will be recalled that the shaft 355 is not released until the next cycle of operation after division is initiated, whereby the link 386 will be raised prior to release of shaft 355. From what has been said, it is apparent that the pusher arm 381 cannot be operated to rock cam shaft shifting lever 384 until two conditions exist, i.e., the preliminary programming mechanism has been operated to five additive cycles to enter the radicand factor into the register and the division operation has been initiated. However, the arm 381 is effective to rock the cam shaft shifting lever 384 (best shown in FIG. 7) when the two preceding conditions are present.

This cam shifting lever 384 is pivotally mounted on a bracket 393 extending laterally from a frame plate 394, the lever being mounted by any suitable means, such as a rivet 395. Associated with the arm 384 is a second, or cam shaft shifting, arm 396, likewise pivotally mounted on the rivet 395. The second arm 396 is resiliently biased to follow the rocking of the arm 384 by a suitable spring 397 tensioned between an ear 398 on arm 384 and an ear 399 on arm 396. The arm 396 carries a pin 400 which bears against the side of a collar 401 (see FIGS. 8 and 9), rigidly secured to a cam shaft 402. If the cam shaft 402 is in proper position for extraction of square root, depending upon the carriage being in the extreme right-hand position, as will hereinafter be explained, the rocking of arm 384 (clockwise in FIG. 7) will rock arm 396 to shift the cam shaft 402 to the right to its operative position for the extraction of square root. However, if the carriage is not in the proper position, i.e., in the next to the extreme position, the arm 384 will rock, and will be held in rocked position (by the latching of arm 381 against arm 384) until the carriage has been shifted to its extreme right-hand position. Thereupon, the second arm 396, under the urgency of spring 397, will be effective to translate the cam shaft 402 to the right to control the extraction of square root. A stop 403 is effective to prevent arm 384 from rocking too far (counter-clockwise in FIG. 7) to engage shoulder 383.

It can be noted at this point that after a radicand factor has been entered and the shaft 355 is rocked back to its normal position to push the arm 384, pusher arm 381 will remain in its raised and effective position until the termination of the square root operation, which occurs following the overdraft in the extreme left-hand carriage position. In this even, the operation of the division control mechanism is terminated and the division control mechanism returns to its normal condition. On the return of the division control mechanism to its normal condition, the link 386 pulls arm 381 below the plane of arm 384, whereupon the arm 384 will return to its normal position under the force of spring 397 and a spring 404 which normally urges the cam shaft 402 to the left. Thereafter, in a subsequent division operation, the link 386 will be raised to release stud 385, but as the upper edge of the arm 381 is engaging the lower side of the arm 384, the arm 381 is ineffective to position the cam shaft, thereby preventing the operation of the square root extraction control mechanism.

In my patent, No. 2,736,494, I provided means whereby the square root shaft 402 could not be translated to the right until the carriage had reached the extreme right-hand position. This was accomplished by means of a mechanism that blocked the tenth order cam from engaging position until the carriage was in the extreme position. In my present invention I have simplified this means by using a block that is associated with the carriage 21. Referring to FIG. 10 I provide a blocking arrangement consisting of two integral arms 410 and 411, joined together by a suitable sleeve. The arms and sleeve are pivotally mounted on the shaft 301. The arm 411 extends rearwardly and downwardly and is provided with a rearward edge that rides along the transversely extending carriage rail 98. The forwardly directed arm 410 is shorter in length and has at its upper end a stud 413 to which a spring 414 is attached—the spring extending forwardly and being secured to a suitable stud 415 on a dent pawl 489. The forward arm 411 lies to the right of a colar 416 of a feed gear 417 that is pinned (or otherwise fastened) on the square root cam shaft 402. The carriage rail 98 has a depression 418 located at the eighth tabular position (or next to the last extreme right-hand position of the carrage), whereby when the carriage is in this position, the arm 411 will be biased by its spring 414 to rock into the depression 418 on the carriage rail. Thereupon arm 410, being an integral part of arm 411, will be rocked (counter-clockwise in FIG. 10) to position its nose in blocking relation with the collar of feed gear 417. Therefore, it can be seen that when the carriage is positioned in its eighth tabular position, or next to the last right-hand position, the blocking arm 411 will be positioned in the depression 418 on the carriage rail 412, thereby positioning the nose of arm 410 in blocking position with the collar 416 of the feed gear 417 and thus preventing the square root cam shaft 402 from shifting into operative position.

The square root mechanism of the present invention is similar in construction to that of the square root mechanism of the above-mentioned patent, in that the cam shaft 402 is normally biased to the left, as shown in FIG. 11, by suitable spring means, such as the compression spring 404 encircling the shaft and seated between an end plate 431 of the square root control box and the collar 401. However, when the arm 396 is rocked (clockwise in FIG. 7 or to the right in FIG. 11), the pin 400 will force the shaft 402 to the right to place a plurality of square root cams 432 carried thereby in operative alignment.

Cam shaft 402, as shown in FIGS. 12 nad 13, carries a cam member 432 in each order of the square root selection mechanism. Each cam is provided with a single toot 433. These teeth and their integral cams are so arranged on the shaft 402 that each tooth is spaced at an angle of 36° from the adjacent cam tooth. Thus, the cam teeth 433 are arranged spirally around the shaft, separated from each other by angles of 36°, so that only one cam 432 will engage a tooth of a gear-engaging arm at any time. After the cam shaft 402 has been shifted to the right, it is rotated, or fed, to rock the respective ordinal cams 432 into their operative position, is sequence as the carriage is shifted toward the left during square root extraction. That is, the cam shaft 402 is rotated an additional increment of 36° as the carriage shifts from one ordinal position to another, so that the respective gear-engaging arms (starting with the highest order and progressing to the lowest in successive ordinal steps) become operative in sequence. By this means the control mechanism is enabled to select the order in which the selection mechanism is to be adjusted.

In each order of the square root programming mechanism in the preferred form, gear-engaging arms 434 (FIGS. 11 and 14) are positioned against separator plates 435 which separate the orders of the square root mechanism. In all of the orders of the square root mechanism the gear-engaging arms 434 are identical in shape and size and are pivotally mounted on a long shaft 436, and in all orders these gear-engagnig arms are rocked by the single tooth 433 on the associated cam 432. The square root cam 432 located in the lowest order of the square root mechanism (to the right in FIG. 11), is slidably but nonrotatably mounted on shaft 402 in order to prevent simultaneous operation of the first and tenth order cams, as will be described hereinafter.

Each gear-engaging arm 434 is provided at its upper edge with a tooth-shaped pressure face 437 (FIG. 14) adapted to be engaged by the tooth 433 of the associated cam 432. Each arm is also provided with a turn-over ear 438 extending to the left, as shown in FIG. 11. The outer, or left, end of each ear is formed with a camming edge 439. The gear-engaging arm is also provided with a depending tail 440 which engages a stud 441 on the "1" to "5" selection slide 50 in the adjacent lower order of the keyboard. The degree of rocking of the arm is computed to be such as to urge the "1" to "5" selection slide 50 forwardly to the "5" value position. Thus, the rocking of arm 434 by the cam 432 rocks the "1" to "5" slide 50 of the adjacent lower order to the "5" position. Simultaneously, the ear 438 engages a conical-shaped hub 443 of a feed gear 444 to translate the feed gear 444 to the left into mesh with a drive gear 445.

Normally, the gear-engaging arm 434 is urged to an inoperative position (counter-clockwise as shown in FIG. 14) by a torsion spring 446 seated between a stud 447 on the tail 440 and a latching ear 448 of a holding pawl 449. It is thus obvious that as the cam shaft 402 is rotated (counter-clockwise in FIG. 14) to successively bring its teeth 433 in rocking engagement with their respective gear-engaging arms 434, the rocking of the gear-engaging arms is operative to insert a value of "5" in the "1" to "5" slide 50 of the adjacent lower order, and to move the feed gear 444 of the order in which the gear-engaging arm is located into mesh with its associated gear 445.

It is also necessary to drive the selection mechanism in a desired progression of single values beginning in the tenth order and shifting order-by-order toward the right. For this purpose I prefer to utilize, as I did in my former patent, No. 2,736,494, a plurality of feed gears 444, one for each order of the selection mechanism. These feed gears are slidably but nonrotatably mounted on a transversely extending square shaft 450. The gears 444 are provided with elongated hubs 443 having a conical camming face, as mentioned above. The cam edge 439 on the various rockable gear-engaging arms 434 is adapted to engage the conical face of the respective gear hub 443 and, upon rocking of the arm 434, to translate the gear 444 and its integral hub to the left. A compression spring 455 is associated with each gear, being seated around the square shaft 450 and compressed between the gear and the adjacent separator plate 435, thereby normally urging the gears 444 to the right to their inoperative positions. Thus, the rocking of an arm 434, under the control of the cam shaft 402, translates the respective gear 444 to the left against the bias of its spring 455, and, in doing so, brings the gear 444 into mesh with the respective positioning gear 445. Thereafter, the rotation of shaft 450, which rotates all gears 444, drives the proper ordinal positioning gear 445. The positioning gear 445, as mentioned above, is used to drive the selection mechanism a single step beginning with "1" in the second cycle of operation in order to provide the tens value progression required in the "fives" method of square root extraction. Therefore, the feed gears 444 and the shaft 450 must be given a single step of movement for each cycle of operation, beginning with the second cycle in each ordinal position of the carriage. The mechanism for thus driving square shaft 450 in single increments of motion is shown fully in the above-mentioned patent and for the sake of brevity will not be mentioned here, but it can be said that, through the gear 445, first the "1" to "5" slide 50 and thereafter the "6" to "9" slide 51 will be fed one increment of movement with each rotation of shaft 450.

It can be mentioned at this time that the shifting of the cam shaft 402 to its operative position was blocked in the tenth order in the above-mentioned Patent No. 2,736,494 by means there fully disclosed. Briefly, this means comprises the tooth 433 of the highest or tenth order cam, which was positioned to lie against the side of the inclined tooth 437 of the gear-engaging arm 434, thereby preventing the cam shaft 402 from being translated to the right to its operative position, when the carriage was in the extreme right-hand position required for the initiation of extractive operation. It was, therefore, necessary, in the former machine, to rock the gear-engaging arm 434 of the tenth order to operative position by other means in order to condition the mechanism for square root extraction. In my preferred form, I can omit this operation by aligning the tooth 433 of the tenth order cam 437 with the inclined tooth 437 of the tenth order gear-engaging arm 434 when the shaft 402 is shifted to the right, as above described. To compensate for the fact that there are ten cams 432 spaced at 36° apart, I have made the first order cam 432 (i.e., the rightmost cam) transversely yieldable, as shown in FIG. 11. Such a means can comprise slidably but non-rotatably mounting the cam 432 in the lowest (rightmost) order on the shaft 402, as by means of a key 550 (FIG. 13) and a complementary notch in the shaft. A compression spring 551 around the shaft and seated against the hub of the cam and the adjacent separator plate 435 biases the cam to the right against a stop, not shown, on the shaft. Thus, movement of the shaft to the right to its operative position resiliently biases the lowest order cam to the right also. When the highest order cam is in its proper position to initiate the extraction operation (the position shown in FIG. 14), the lowest order cam will trail it by 324° (lie one 36° increment counter-clockwise in FIG. 14), and so will lie in the angular position to abut the side of the gear-engaging arm of the lowest order. Then, when the shaft is shifted to the right, the cam will yield on the shaft. However, when the cam shaft is rotated one increment, the lowest order cam rotates away from the gear-engaging arm, and the cam will be pushed to the right by its spring 551, so that it will be in the proper plane to engage the gear-engaging arm when the shaft is rotated to the first order angular position.

In my former patent, the cam shaft 402 was driven directly from the shifting of the carriage. This gave the cam shaft 402 a limited time to operate in the latter part of the shift cycle. In my present form, I drive the cam shaft 402 directly from the outset of the shift cycle, thereby allowing added time to complete the feeding of the square root cam shaft 147.

The operation of the automatic division mechanism, as mentioned above, controls the functioning of the machine so as to cause the divisor to be repeatedly subtracted from the dividend until the overdraft occurs in the accumulator, whereupon the overdraft will be corrected and the carriage shifted one ordinal space to the left, and the process will be repeated in the adjacent lower order. The number of subtraction cycles effected in each order of the accumulator is registered in the revolutions counter so as to provide a visual representation of the quotient at the end of the problem. During division, the machine is controlled by a programmed control device which becomes effective each time an overdraft occurs in the accumulator. This division programming device controls a program of operation of the add-subtract gears and the carriage shift mechanism so as to cause the predetermined sequence of add, shift and reinitiate subtract operations to occur during uninterrupted cycles of operation of the actuating mechanism of the machine. A division operation is normally initiated by depression of a division key which causes a programmed control device to be operatively connected with the add-subtract gate and also with the carriage shift mechanism, and in addition, renders the overdraft control mechanism effective to control the cycling of the programming device.

The program control shaft 182, as mentioned above, extends through the control plate 155 (FIG. 5) and is provided on its right end with a mutilated gear 210 which is adapted to be moved axially into, and out of, meshing relationship with a larger two-tooth mutilated gear 211. The displacement of this shaft and the mutilated gear 210 to the right to initiate a multicyclic operation is operated through the conventional mechanism of the Friden machine, as described above. If the carriage is in its rightmost position, the square root cam shaft block will be disabled to allow the square root shaft to be shifted to its operative position. After the mutilated gear 210 has been shifted into the plane of its driving gear 211, an add cycle will be established, but at this time, by virtue of the keyboard having been cleared, there will not be a registration in the accumulator dials. The mutilated gear 210 will then be rotated to its shift position, but the carriage, being in its rightmost position, cannot be shifted. Through mechanism to be described hereinafter, the square root shaft will be rotated one increment of movement to equal 36° during the attempted shifting cycle to insert a value of "5" into the ninth order of the keyboard and enable the conventional square root feed in the tenth order. Further rotation of the mutilated gear 210 will position the conventional digitation control, or plus-minus, gate into its subtractive position to subtract the value of "5" from the ninth order of the radicand factor standing in the accumulator dials. If the radicand factor is larger than "5," a step-by-step progression of the adjacent higher order selection slides will take place to increase the value standing in the keyboard from "5" to "15," "25," etc., until an overdraft is effected. The overdraft will again shift the mutilated gear 210 to the right into operative position to add back the last value that caused the overdraft, then the subsequent shift cycle will take place to shift the carriage one step to the left, and then repeated subtraction cycles will occur until an overdraft is again effected.

However, if the carriage is in its next to the rightmost carriage position at the initiation of division, the first cycle of the mutilated gear will not cause a change of registration in the accumulator, as the keyboard has been cleared before division was initiated and the "5" in the ninth order has not yet been set in the selection slides by virtue of the square root shaft being blocked from its operative position in this carriage position. After the shift of the carriage to its rightmost position (as is conventional in my former machine due to the automatic operation of the dividend-divisor aligning mechanism), the square root shaft will be shifted to operative position, allowing an initial value of "5" to be inserted into the selection mechanism, after which the identical multicyclic operation described above, will take place.

In my present invention I use the program shaft 182 to drive the feed mechanism of the square root cam shaft 402. Referring to FIGS. 8 and 10, a cam 470 is pinned on, or otherwise securely fastened to, the left-hand end of shaft 182. A cam follower arm 471 is pivotally supported on a stub shaft 472 located above shaft 182. The follower arm 471 carries a roller 473 adjacent its lower end. A spring 474, secured to the lower end of arm 471, holds the roller 473 against the periphery of the cam. At its upper end, above pivot 472, the arm 471 has a reduced portion, one side of which is formed as an ear 475. Also pivoted to stub shaft 472 is an upwardly directed arm 476 which has an ear 477 directly opposite ear 475. Between the ears 477 and 475, a tension spring 478 is secured to provide a yieldable means between the arms 471 and 476 which tends to bias arm 476 rearwardly (clockwise in FIG. 10) when arm 471 is rocked by cam 470. A stud 479 mounted on arm 476 abuts the forward portion of arm 471 adjacent ear 475, to force arm 476 forwardly to its initial position upon counter-clockwise movement of lever 471. A feed dog 480 is pivotally secured at the upper end of arm 476 by a pivot pin 481. A forwardly projecting hooked portion 482 is adaptable to engage the teeth of feed gear 417 which is pinned to the square root cam shaft 402. The feed dog 480 has a downwardly extending leg 483 formed with a laterally projecting ear 484 extended to the rear and directed behind the upper portion of arm 476. The arm 476 also has a formed ear 485 opposite that of 484. A tension spring 486 is secured between the two ears 484 and 485, urging the feed dog upwardly into engagement with gear 417 (in a clockwise direction in FIG. 10) and against a stop pin 487 that is located forwardly of the reduced arm portion 483 of the feed dog to limit the clockwise movement of feed dog 480.

The cam 470 has a restricted portion of approximately 180° and has a high lobe 488 angularly located to coincide with the shift cycle of the program mutilated gear 210. Thus, when the mutilated gear shaft 182 is shifted to its operative position by an overdraft condition, the cam 470, by its lobe 488, will, in the second, or shifting, phase of the three-cycle program, rock arms 471 and 476 (clockwise in FIG. 10) about the pivot 472. This will cause the feed dog 480 to engage its tooth 482 with the teeth of the feed gear 417 to feed the shaft 402 one angular step.

A holding pawl 489 is provided for the gear 417 to hold this gear in its adjusted position. This holding pawl 489 is pivotally mounted on the stub shaft 370 and has a rearwardly directed arm 490 that has, at its extremity, a bent ear 491 that lies in the plane of the teeth of the gear 417. Another arm 492 extends upwardly and forwardly from the pivot, and its upper end underlies the ear 387 on the division link 386. A stud 415, previously mention, is secured to the arm 492 and the spring 414 is tensioned between the stud 415 and a stud 413 on the block arm 410, also previously mentioned. Thus, the spring 414 urges the holding pawl 489 to engage the teeth of gear 417, but when arm 492 engages the ear 387 on division lever 386, the holding pawl 489 is held in its raised and inoperative position.

As mentioned above, if the carriage is in its next to the highest position, which is the eighth tabular position, the blocking assembly 410, 411 will block the square root cam shaft 402 from being translated to the right. In this instance, when a false overdraft is established in the register by the conventional dividend-divisor aligning mechanism, a sequence of operations will occur to displace the mutilated gear shaft 182 to the right (FIGS. 3 and 5) to engage the mutilated gear 210 with its driving gear 211 to give a sequence of operations consisting of an add, a shift, and a subtract cycle. By virtue of the keyboard value being cleared out of the keyboard and the square root shaft 402 being held from translation to the right, these cycles will be idle, even though the gate has been positioned in the add or subtract position, but in the shift cycle of the mutilated gear 210, the carriage will shift to the right to align the highest significant figures. This will cam the blocking assembly 410, 411 out of blocking position, by virtue of a cam angle in the notch 418 in the carriage rail 98 (in its clockwise direction in FIG. 10), thereby rocking the arm 410 from engagement with the collar 416 of the cam shaft 402. As mentiond previously, the cam shaft shifting arm 396 is spring-biased to translate cam shaft 402 to the right, so that it will then be effective to move the cam shaft to the right to align the tenth to second order cam tooth 433 with their respective teeth 437 on the gear-engaging arms (see FIG. 11). During the shifting phase of this operation (which is an idle program if the carriage is in its extreme right-hand position), the rocking of arms 471, 476 (FIG. 10) will rotate the tenth order gear-engaging arm 434 to its operative position (clockwise of the position shown in FIG. 14). The rocking of the gear-engaging arm 434 will translate the "1" to "5" selection slide 50 of the ninth order to its "5" position by virtue of the extension 440 of the gear-engaging arm pushing against the stud 441 on that "1" to "5" slide, and will shift the selection feed gear 444 in the tenth order to the left to engage gear 445 and thus condition the selection bars of the tenth order for the necessary operation.

This ordinal series of operations, in which the tenth order selection slides will be fed forwardly in increments of "1," will eventually cause an overdraft, which will be a true overdraft, and will cause the mutilated gear shaft 182 to be translated to the right. Such shifting of shaft 182 moves the mutilated gear 210 into engagement with the gear 211 to be driven the three program cycles of the add and shift operations, and the reinitiation of continuous subtractions in the adjacent lower order. The value of "5" formerly standing in the ninth order selection slide 50 will now be erased, to be inserted in the eighth order, and the selection slides in the ninth order will, beginning in the second cycle of the new ordinal series, be fed forwardly in increments of "1" to effect subtractions from the value standing in the accumulator dials until an overdraft is reached. The new overdraft will initiate a new program of adding back into the accumulator the last value subtracted and then shifting the carriage one ordinal space to the left. The rotation of the program shaft 182 will also, by virtue of the high point 488 of cam 470 registering with the roller 473 on the feed arm 471, cause the rotation of the cam shaft 402 (in a counterclockwise direction in FIG. 10) one step of 46°, thereby further rocking the ninth order cam 473 to disengage its tooth 433 from the tooth 437 of the respective gear-engaging arm 434 and simultaneously cause the eighth order cam to engage its gear-engaging arm to shift the eighth order gear 444 into mesh with its gear 445.

It can be mentioned at this time that it is necessary to progressively shift the order from the left to the right in which the "5" is inserted and to likewise progressively enable a drive of the feed mechanism which is operable to insert a "1" in the next higher order for the second cycle of operation and thereafter to increase the value in that next higher order in each cycle of operation by "1." This has been done through the gears 444 and 445. The gear 445 has an integral ten-tooth spur gear 500 which is in mesh with a rack 501 pinned to a square root selection slide 502.

The positioning gear 445, as heretofore mentioned, is used to drive the selection mechanism a single step beginning with "1" at the second cycle of operation, in order to provide the tens progression required in that method of extraction. Thus, the feed gears 444 and the shafts 450 must be given a single step of movement for each cycle of operation, beginning with the second cycle in each ordinal position of the carriage. The mechanism for giving the feed shaft 450 this single increment of motion is fully described in the above-mentioned Patent No. 2,736,494, but perhaps should be mentioned briefly here.

The feed, or drive, is driven from the main drive shaft 65. A cam follower 510 (FIG. 10) is pivotally mounted, as by stub shaft 472, adjacent the arms 471 and 476. The follower 510 has a forwardly extending arm 511, the forward end of which is provided with a cam follower roller 512. In the plane of the roller is a cam 513 rigidly secured to the transverse drive shaft 65. The follower arm 511 is biased toward engagement with the cam by means of a spring 514 tensioned between a stud on the follower arm 511 and a fixed stud 515, as shown in FIG. 10. A live pawl 516 is pivotally secured to the upper end of follower 510 by any suitable means, such as a stud 517. The forward end of the live pawl 516 is provided with a feed nose 518, the pawl being urged downwardly (counter-clockwise in FIG. 10) by a suitable spring, not shown. The nose of the live pawl 516 engages the teeth of a ratchet gear 519 rigidly secured to the feed shaft 450. Thus, the rocking of the follower 510 with each cycle of a machine operation is effective to feed the ratchet gear 519 a single step (counterclockwise in FIG. 10).

The follower 510 is normally latched in an inoperative position shown in FIG. 10, by a suitable latch 522 pivotally mounted on the stud 515 on an auxiliary frame plate. A nose 523 of the latch arm 522 engages a square stud 524 on the lower arm of the follower 510, as shown. The latch arm 522 carries a short stud 525 that is embraced by a slot 526 carried in the division link 386, previously described. It will be recalled that upon initiation of a division operation the link 386 is lifted. Lifting of link 386 raises the latch arm 522 out of latching engagement with the square stud 524, thereby releasing the follower 510 to the force of the spring 514. The spring 514 rocks the follower 510 (counter-clockwise in FIG. 10) until the roller 512 engages the edge of the cam 513. Thus the follower 510 is released for operation and thereby drives the feed shaft 450 in all division operations, but rotation of the feed shaft during the ordinary division operation is of no effect as the cam shaft, while rotating during the shifting phase of division, is blocked against a rightward movement necessary to enable the cam to rock the gear-engaging arms. Therefore, the rotation of the feed shaft 450 will not change the setting of the selection mechanism and no harm is done by rotation of the feed shaft 450.

At the completion of a square root extraction the square root cam shaft will be returned to its inoperative position. This is accomplished in the following manner: When the division operation terminates, the shaft 224 (FIG 4), returns to its original position, thereby depressing the link 386 (FIG. 10). The depression of link 386 rocks the pusher arm 381 downwardly, releasing the arm 384. The cam shaft 402, under the force of its spring 404 (FIG. 8), is thereupon moved to the left to render the square root cams ineffective. The depression of the link 386 also rocks the feed arm latch 522 downwardly to engage the feed arm 510 and latch it against further operation. Therefore, regardless of whether the extraction operation is terminated by operation of a conventional stop key, or by completion of operation in the extreme right-hand order of the machine, the square root shaft is disabled and returned to the left to its normal position.

Simultaneously with the return of the cam shaft to the left after the ordinal cams 432 are disengaged from the disengaging arms 434, the cam shaft is rotated back to its full-cycle position. As seen in FIGS. 8 and 9, a grooved collar 528 is pinned to the square root cam shaft 402 between the feed gear 417 and the fixed collar 401. This grooved collar is provided with a fixed pin 529 that extends to the left and bears against a floating overthrow stop 531. A spring 530 attached to the fixed pin 529 on the grooved collar 528 and a pin on the side frame (not shown) urges the collar 528 and the cam shaft 402 in a counter-clockwise direction. The extended pin 529 bears against an intermediate portion 533 of the stop 531, thereby urging a wide stop tooth 532 against the shaft 450. Thus during an extraction operation, the cam shaft 402 will be fed in 36° steps in a clockwise direction. The extent of the feed of cam shaft 402 will carry the grooved collar 528 with the extended fixed pin, clockwise in FIG 9, until the fixed pin 529 will contact the opposite shoulder 534 of the intermediate portion 533 of the stop 531, and carry the floating stop approximately 160° before the stop tooth 532 contacts the shaft 355 to terminate clockwise rotation of cam shaft 402. With this arrangement the cam shaft 402 can be rotated in excess of 360° to give added rotation for the first order cam to complete its movement.

As mentioned above, when the cam shaft 402 is released to shift to the left, the spring 530 will then rotate the cam shaft and the ordinal cams back to their full-cycle position.

As mentioned above, the spur gear 500 (FIG. 14) is constantly in mesh with the rack 501 secured to the rearward portion of the feed slide 502 which is supported for longitudinal movement of the machine. The square root slide 502 is resiliently urged toward the rear by a suitable spring, not shown. A slide 502 will be moved forwardly by the rotation of its positioning gear 445, which occurs whenever the drive shaft 450 is rotated and the drive gear 444 of that particular order is moved into meshing engagement with its positioning gear, as explained above.

The translation of slide 502 by the feed mechanism herein described, is operative to position the conventional selection slides of the machine. The forward movement of driving slide 502 will first move the "1" to "5" slide 50 and then the "6" to "9" slide 51 to progressively set the selection mechanism to values of "1" to "9" as required by this method of square root extraction. By this means, any value from "1" to "9" may be placed into the selection mechanism, in any order, where it is latched by conventional means.

It can be seen at this time that the series of subtractive operations continues until an overdraft occurs, which will then shift the shaft 182 to the right. This will block the operation of the feed arm that operates the feeding of the selection slides, as described in my patent above-mentioned. Simultaneously, the division control mechanism operates in the conventional manner to cause the single corrective additive cycle and then shifts the carriage one step to the left. The second phase of rotation of shaft 182, by virtue of the high point 438 of the cam 470 rocking arm 471, causes an incremental feed, or rotation, of the gear 417 and cam shaft 402. Such rotation of the square root cam shaft causes one order to rock out of engagement with its gear-engaging arm 434 and causes the tooth 433 of the adjacent lower order cam to rock its gear-engaging arm to operative position. The release of the gear-engaging arm in one order and the substantially simultaneous operation of the arm in the adjacent lower order releases the value of "5" in the former lower order and inserts it into the second lower order of the selection mechanism. In the next cycle, the value then standing in the selection mechanism is subtracted. Thereafter, the feed mechanism is operative to feed the selection slides, to increase the value standing in the new operative order by "1," thus changing the value until an overdraft occurs. Thereupon, the overdraft mechanism shifts the division programming shaft 182 to cause an additive corrective cycle and a shifting of the carriage in a like sequence of operation to the lower orders of the machine. Thereafter, regardless of whether the extraction operation is terminated by conventional means, or by completion of operation in the extreme right-hand order of the machine, the square root extraction mechanism is disabled and returned to its normal position by the means described in my former patent above-mentioned.

I claim:

1. In a calculating machine for the extraction of square root having a register and an ordinally arranged value selection mechanism, means for shifting the register with respect to the value selection mechanism, a division mechanism for dividing a dividend in the register by a divisor in the selection mechanism by the method of repeated subtraction of the divisor from the dividend in successive ordinal series of operations including the step of operating the shifting means, a division program means actuated in response to an overdraft in the register and, when so actuated, operable to control operation of the division mechanism including operation of said shifting means, means for inserting a value of "5" in a preselected order of the selection mechanism prior to operation of said division mechanism, setting means operable to progressively adjust the selection mechanism of the adjacent higher order to said preselected order in increments corresponding to a value of "1," and ordinally operable adjustable means operable to adjust the setting means for operation in successive orders; feed means for adjusting said ordinal adjustable means operable simultaneously with the shifting operation of said program means comprising a feed cam operated by said division program means, a feed ratchet adapted to operate said ordinal adjustable means, and connecting means operated by said feed cam and effective to operate said feed ratchet so constructed and arranged as to allow said adjustable means to be operated simultaneously with the initial portion of the shifting operation of said program means.

2. In a calculating machine for the extraction of square root having:
(1) a register,
(2) an ordinally arranged selection mechanism,
(3) an actuating means operable to enter values determined by said selection mechanism into said register additively or subtractively,
(4) means for shifting said register,
(5) a division control means effective to establish a repetitive subtraction operation of the actuating means,
(6) a division programming shaft effective in response to an overdraft in said register to establish an operating program including additive operation of said actuating means to correct said overdraft and operation of said shifting means to shift the carriage one ordinal space followed by resumption of subtractive operation of the actuating means in the adjacent order,
(7) adjusting means operable to progressively adjust each order of the selection mechanism in increments corresponding to a value of "1,"
(8) setting means for inserting a value of "5" in each order of said selection mechanism,
(9) means for operating said setting means in one order and operating the adjusting means in the adjacent higher order, and
(10) an order control means for operating the last-mentioned means in an ordinally diminishing sequence,
an improved feed means for operating said order control means simultaneously with the operation of the shifting means caused by said programming member comprising:
(11) a cam on said programming shaft, and
(12) a feed pawl operated by said cam and operating said order control means.

3. In a calculating machine for the extraction of square root having:
(1) a dividend register,
(2) an ordinally arranged selection mechanism,
(3) means for shifting said register interordinally across said selection mechanism,
(4) a division mechanism for dividing a dividend in the dividend register by a divisor in the selection mechanism by the method of a repealed subtraction of the divisor from the dividend in successive ordinal series of operations including an adjustable program means effective in an adjusted position to initiate operation of said shifting means,
(5) means for inserting a value of "5" in a preselected order prior to operation of said division mechanism,
(6) setting means operable to progressively adjust the selection mechanism of the adjacent higher order to said preselected order in increments corresponding to a value of "1," and
(7) ordinally operative adjustable means operable to adjust the setting means for operation in succession ordinal positions,
an improved feed means for adjusting said ordinally operative means simultaneously with the shifting operation of said program means comprising:
(8) a feed cam operated by said program means, and
(9) a feed pawl operated by said cam for operating said ordinally operative means.

4. In a calculating machine for the extraction of square root having a register and an ordinally arranged value selection mechanism, means for shifting the register with respect to the value selection mechanism, a division mechanism for dividing a dividend in the register by a divisor in the selection mechanism by the method of repeated subtraction of the divisor from the dividend in successive ordinal series of operations including the steps of correcting the overdraft and shifting the register, a division program means including a program shaft actuated in response to an overdraft in the register and, when so actuated, operable to control operation of the division mechanism including operation of said shifting means, means for inserting a valve of "5" in a preselected order of the selection mechanism prior to operation of said division mechanism, setting means operable to progressively adjust the selection mechanism of the adjacent higher order to said preselected order in increments corresponding to a value of "1," and ordinally operable adjustable means operable to adjust the setting means for operation in successive orders; and improved feed means for adjusting said adjustable means operable simultaneously with the shifting operation of said program means comprising a feed cam mounted on said shaft, a feed pawl operable by said cam, and a feed ratchet operable by said pawl and adapted to operate said adjustable means.

5. In a calculating machine for the extraction of square root having:
(1) a register,
(2) an ordinally arranged value selection mechanism,
(3) an actuating mechanism controlled by said selection mechanism and operative to enter values into said register,
(4) means for shifting the register,
(5) a division mechanism for dividing a dividend in the register by a divisor in the selection mechanism by the method of repeated subtraction of the divisor from the dividend in successive ordinal series of operations including means for sensing an overdraft during division operations,
(6) a division program means operated by said overdraft sensing means and including a program shaft operable to control operation of said acuating mechanism to correct the overdraft and the operation of said shifting means,
(7) means for inserting a value of "5" in a preselected order of the selection mechanism prior to operation of said division mechanism,
(8) setting means operable to progressively adjust the selection mechanism of the adjacent higher order in increments corresponding to a value of "1,"
(9) ordinally operable adjustable means operable to adjust the inserting means and the setting means for operation in successive orders,
a feed means for adjusting said ordinal adjustable means operable simultaneously with the shifting operation of said program means comprising:
(10) a feed cam mounted on said shaft, and
(11) a feed ratchet operated by said cam and adapted to operation said ordinally operable adjustable means.

References Cited in the file of this patent
UNITED STATES PATENTS
2,736,494    Ellerbeck et al. _____ Feb. 28, 1956

UNITED STATES PATENT OFFICE
CERTIFICATE OF CORRECTION

Patent No. 3,062,439                               November 6, 1962

Grant C. Ellerbeck

It is hereby certified that error appears in the above numbered patent requiring correction and that the said Letters Patent should read as corrected below.

Column 1, line 22, after '"5"', second occurrence, insert -- is --; column 4, line 64, for "directy" read -- directly --; column 5, line 31, for "form" read -- forms --; column 6, line 54, for "ovedraft" read -- overdraft --; column 7, line 63, for "read" read -- rear --; column 9, lines 64 and 65, for "accumultaor" read -- accumulator --; column 11, line 12, for "extracton" read -- extraction --; column 13, line 56, for "ordinarily" read -- ordinally --; column 16, line 7, for "four" read -- fourth --; line 59, for "251" read -- 351 --; column 18, line 71, for "even" read -- event --; column 19, line 18, after "10" insert a comma; line 28, for "dent" read -- detent --; line 29, for "colar" read -- collar --; line 33, for "carrage" read -- carriage --; line 58, for "nad" read -- and --; line 61, for "toot" read -- tooth --; line 69, for "is" read -- in --; column 20, line 11, for "gear-engagnig" read -- gear-engaging --; line 21, for "turn-over" read -- turned-over --; line 41, for "in" read -- into --; column 23, line 43, for "mention" read -- mentioned --; column 24, line 39, for "46°" read -- 36° --; column 27, line 67, for "repealed" read -- repeated --; column 28, line 4, for "succession" read -- successive --; line 32, for "and" read -- an --; line 54, for "acuating" read -- actuating --; line 71, for "operation" read -- operate --.

Signed and sealed this 20th day of October 1964.

(SEAL)
Attest:

ERNEST W. SWIDER                               EDWARD J. BRENNER
Attesting Officer                                Commissioner of Patents